(12) United States Patent
Chen et al.

(10) Patent No.: US 12,474,593 B2
(45) Date of Patent: Nov. 18, 2025

(54) CAMERA MODULE, ELECTRONIC DEVICE AND VEHICLE DEVICE

(71) Applicant: LARGAN DIGITAL CO., LTD., Taichung (TW)

(72) Inventors: Hao Jan Chen, Taichung (TW); Lin An Chang, Taichung (TW); Ming-Ta Chou, Taichung (TW); Te-Sheng Tseng, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 903 days.

(21) Appl. No.: 17/668,278

(22) Filed: Feb. 9, 2022

(65) Prior Publication Data

US 2023/0100691 A1 Mar. 30, 2023

Related U.S. Application Data

(60) Provisional application No. 63/248,966, filed on Sep. 27, 2021.

(51) Int. Cl.
*G02B 27/64* (2006.01)
*G02B 7/09* (2021.01)
(Continued)

(52) U.S. Cl.
CPC ............ *G02B 27/646* (2013.01); *G02B 7/09* (2013.01); *G03B 3/10* (2013.01); *G03B 13/36* (2013.01);
(Continued)

(58) Field of Classification Search
CPC .......... G02B 27/646; G02B 7/08; G02B 7/09; H04N 23/55; H04N 23/682; G03B 13/36
See application file for complete search history.

(56) References Cited

U.S. PATENT DOCUMENTS 9,578,242 B2  2/2017  Kang et al.
9,964,778 B2  5/2018  Kim et al.
(Continued)

FOREIGN PATENT DOCUMENTS

CN  105652557 A  6/2016
CN  112462562 A  3/2021
(Continued)

OTHER PUBLICATIONS

European Search Report in Application No. 22168768721.3 Dated Nov. 10, 2022.
(Continued)

*Primary Examiner* — Ephrem Z Mebrahtu
(74) *Attorney, Agent, or Firm* — Maschoff Brennan

(57) ABSTRACT

A camera module includes an imaging lens assembly having an optical axis and a driving device including a fixed component, a lens carrier, a magnet carrier, a first ball group, and a second ball group. The imaging lens assembly is disposed in the lens carrier. The magnet carrier has a first groove group extending parallel to the optical axis and a second groove group extending perpendicular to the optical axis. One of the fixed component and the lens carrier has a third groove group disposed opposite to the second groove group. The imaging lens assembly is movable with respect to the fixed component on a plane perpendicular to the optical axis via the second ball group disposed between the second groove group and the third groove group and along a direction parallel to the optical axis through the first ball group disposed in the first groove group.

17 Claims, 25 Drawing Sheets

(51) Int. Cl.
    *G03B 3/10*       (2021.01)
    *G03B 13/36*     (2021.01)
    *G03B 17/12*     (2021.01)
    *H04N 23/55*     (2023.01)
    *H04N 23/57*     (2023.01)
    *H04N 23/68*     (2023.01)

(52) U.S. Cl.
    CPC ............. *G03B 17/12* (2013.01); *H04N 23/55* (2023.01); *H04N 23/687* (2023.01); *G03B 2205/0015* (2013.01); *G03B 2205/0069* (2013.01); *H04N 23/57* (2023.01)

(56) References Cited

U.S. PATENT DOCUMENTS

| | | |
|---|---|---|
| 10,133,086 B2 | 11/2018 | Kim et al. |
| 2020/0225443 A1 | 7/2020 | Lim et al. |
| 2021/0173226 A1 | 6/2021 | Lee et al. |
| 2021/0247663 A1 | 8/2021 | Lee et al. |
| 2021/0266463 A1 | 8/2021 | Chun et al. |
| 2021/0271049 A1 | 9/2021 | Seo et al. |
| 2021/0289111 A1 | 9/2021 | Lim et al. |
| 2023/0100691 A1 | 3/2023 | Chen et al. |
| 2023/0171475 A1* | 6/2023 | Jang ........................ H04N 23/54 348/373 |

FOREIGN PATENT DOCUMENTS

| | | |
|---|---|---|
| CN | 216561329 U | 5/2022 |
| EP | 2876476 A1 | 5/2015 |
| KR | 20190024443 A | 3/2019 |
| KR | 20200124413 A | 11/2020 |
| TW | 1782787 B | 11/2022 |

OTHER PUBLICATIONS

European Search Report in Application No. 22168721.3 Dated Oct. 11, 2022.
ID Office Action dated Mar. 10, 2025 as received in Application No. P00202209375.
CN Office Action dated Apr. 30, 2025 as received in Application No. 202111653458.3.
EU Extended European Search Report dated Sep. 15, 2025 in application No. 25183334.9.

\* cited by examiner

CAMERA MODULE, ELECTRONIC DEVICE AND VEHICLE DEVICE

RELATED APPLICATIONS

This application claims priority to U.S. Provisional Application 63/248,966, filed on Sep. 27, 2021, which is incorporated by reference herein in its entirety.

BACKGROUND

Technical Field

The present disclosure relates to a camera module, an electronic device and a vehicle device, more particularly to a camera module applicable to an electronic device and a vehicle device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices and vehicle devices equipped with optical systems are trending towards multi-functionality for various applications, and therefore the functionality requirements for the optical systems have been increasing.

In recent years, there is an increasing demand for electronic devices and vehicle devices featuring compact size, but conventional optical systems, especially the optical systems with auto-focus, optical image stabilization and zoom functions, are difficult to meet the requirements of miniaturization, high image quality and freedom of movement in three-dimension. Conventional optical systems usually have shortcomings of poor lens driving in three-dimension, thereby unable to meet the requirements of the current technology trends. Therefore, how to improve the lens driving accuracy of the optical systems for meeting the requirement of high-end-specification electronic devices and vehicle devices is an important topic in this field nowadays.

SUMMARY

According to one aspect of the present disclosure, a camera module includes an imaging lens assembly and a driving device. The imaging lens assembly has an optical axis. The driving device includes a fixed component, a lens carrier, a magnet carrier, a first ball group, and a second ball group. The imaging lens assembly is disposed in the lens carrier. The magnet carrier has a first groove group and a second groove group. The first groove group extends along a first direction parallel to the optical axis, and the second groove group extends along a second direction perpendicular to the optical axis. The first ball group is disposed in the first groove group. The second ball group is disposed in the second groove group. One of the fixed component and the lens carrier has a third groove group, and another one of the fixed component and the lens carrier has a fourth groove group. The third groove group extends along a third direction being perpendicular to the optical axis and being different from the second direction and is disposed opposite to the second groove group. The second ball group is disposed in the third groove group, and the imaging lens assembly is movable with respect to the fixed component on a plane defined by the third direction and the second direction via the second ball group. The fourth groove group extends along the first direction parallel to the optical axis and is disposed opposite to the first groove group. The first ball group is disposed in the fourth groove group, and the imaging lens assembly is movable with respect to the fixed component along the first direction via the first ball group. The third direction is orthogonal to the second direction, and each of the third groove group and the second groove group is in physical contact with the second ball group.

According to another aspect of the present disclosure, a camera module includes an imaging lens assembly and a driving device. The imaging lens assembly has an optical axis. The driving device includes a fixed component, a lens carrier, a magnet carrier, a first ball group, and a second ball group. The imaging lens assembly is disposed in the lens carrier. The magnet carrier has a first groove group and a second groove group. The first groove group extends along a first direction parallel to the optical axis, and the second groove group extends along a second direction perpendicular to the optical axis. The first ball group is disposed in the first groove group. The second ball group is disposed in the second groove group. One of the fixed component and the lens carrier has a third groove group, and another one of the fixed component and the lens carrier has a fourth groove group. The third groove group extends along a third direction being perpendicular to the optical axis and being different from the second direction and is disposed opposite to the second groove group. The second ball group is disposed in the third groove group, and the imaging lens assembly is movable with respect to the fixed component on a plane defined by the third direction and the second direction via the second ball group. The fourth groove group extends along the first direction parallel to the optical axis and is disposed opposite to the first groove group. The first ball group is disposed in the fourth groove group, and the imaging lens assembly is movable with respect to the fixed component along the first direction via the first ball group. The second groove group has at least one strip V-shaped groove and at least one U-shaped groove, and the third groove group has at least one strip V-shaped groove and at least one U-shaped groove. The at least one strip V-shaped groove of the second groove group and the at least one strip V-shaped groove of the third groove group each extend along a direction to be orthogonal to each other. The at least one strip V-shaped groove of the second groove group corresponds to the at least one U-shaped groove of the third groove group, and the at least one U-shaped groove of the second groove group corresponds to the at least one strip V-shaped groove of the third groove group.

According to another aspect of the present disclosure, an electronic device includes one of the aforementioned camera modules.

According to another aspect of the present disclosure, a vehicle device includes one of the aforementioned camera modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
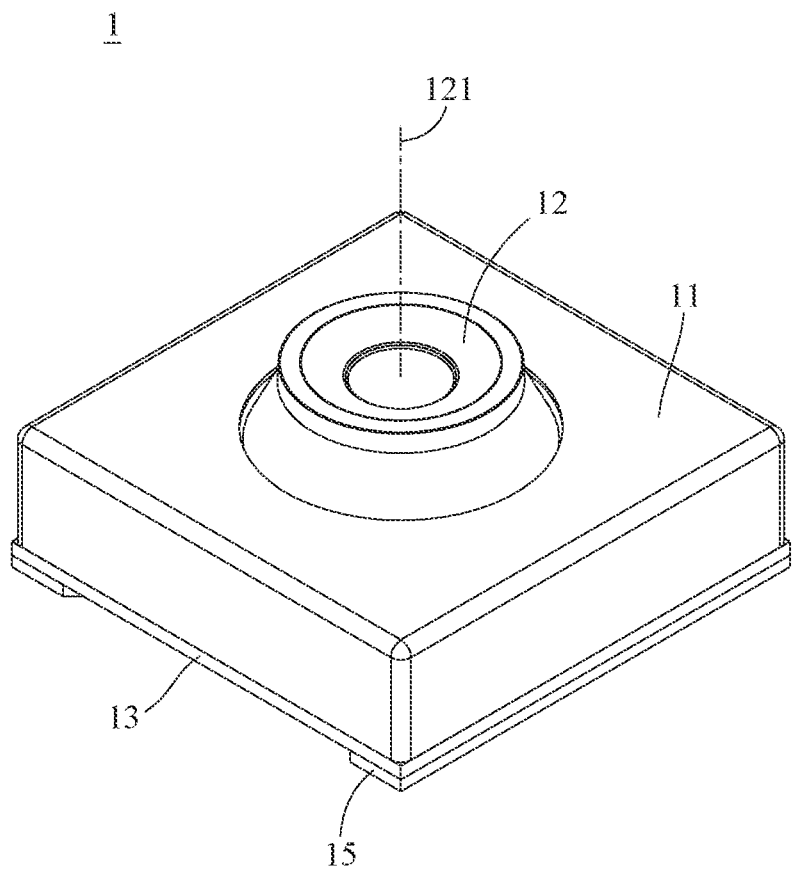
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module that includes an imaging lens assembly and a driving device. The imaging lens assembly has an optical axis. The driving device includes a fixed component, a lens carrier, a magnet carrier, a first ball group and a second ball group. The imaging lens assembly is disposed in the lens carrier.

The magnet carrier has a first groove group and a second groove group. The first groove group extends along a first direction parallel to the optical axis, and the second groove group extends along a second direction perpendicular to the optical axis.

One of the fixed component and the lens carrier has a third groove group, and the other one has a fourth groove group. The third groove group extends along a third direction being perpendicular to the optical axis and being different from the second direction and is disposed opposite to the second groove group. The fourth groove group extends along the first direction parallel to the optical axis and is disposed opposite to the first groove group.

The first ball group is disposed between the first groove group and the fourth groove group, and the imaging lens assembly is movable with respect to the fixed component along the first direction via the first ball group. Therefore, it is favorable for providing a relatively long movement for the imaging lens assembly with respect to the fixed component along the first direction parallel to the optical axis.

The second ball group is disposed between the second groove group and the third groove group, and the imaging lens assembly is movable with respect to the fixed component on a plane defined by the second direction and the third direction via the second ball group. Therefore, it is favorable for providing the imaging lens assembly with degrees of freedom of movement on a two-dimensional plane by a single ball-track combination.

Moreover, the second direction and the third direction can be orthogonal to each other, and each of the second groove group and the third groove group can be in physical contact with the second ball group. Moreover, the second ball group can include at least one ball that can be in two-points contact with one of the second groove group and the third groove group and in one-point contact with the other one. The form of two-points contact can restrict the ball to move only along the direction in which the groove group extends, and the form of one-point contact can provide support for the ball and allow the ball to move within a small range on a plane. Therefore, it is favorable for reducing friction between the groove group and the ball and allowing a relatively large manufacturing tolerance so as to increase assembly efficiency. Moreover, the at least one ball can also be in two-points contact with each of the second groove group and the third groove group. Therefore, it is favorable for restricting the ball to move only along the directions in which the two groove groups extend; it is also favorable for increasing the moving linearity of the imaging lens assembly, such that the driving device can control the imaging lens assembly by using a simple circuit controller, thereby providing the movement needed for compensating images. Moreover, the second ball group can also include at least four balls, and the second groove group can include at least four grooves in which the at least four balls are respectively disposed. Therefore, it is favorable for providing a relatively stable supporting force for preventing skewness of the imaging lens assembly so as to increase movement stability.

Moreover, the second groove group can have at least one strip V-shaped groove and at least one U-shaped groove, and the third groove group can have at least one strip V-shaped groove and at least one U-shaped groove. The at least one strip V-shaped groove of the second groove group and the at least one strip V-shaped groove of the third groove group can each extend along a direction to be orthogonal to each other, the at least one strip V-shaped groove of the second groove group corresponds to the at least one U-shaped groove of the third groove group, and the at least one U-shaped groove of the second groove group corresponds to the at least one strip V-shaped groove of the third groove group. However, the present disclosure is not limited thereto. In some other embodiments, each of the first groove group, the second groove group, the third groove group and the fourth groove group can be a narrow strip V-shaped groove, a wide U-shaped groove or a combination thereof.

Through the configuration structure discussed above, it is favorable for providing the imaging lens assembly with freedom of translational motion in a three-dimensional space so as to achieve auto focus and image stabilization. Also, this configuration can simplify assembly processes and make the driving device to be high-precisely controllable during driving the imaging lens assembly.

Specifically, in some embodiment, the third groove group can be provided by the lens carrier, and the fourth groove group can be provided by the fixed component. The magnet carrier can be movable with respect to the fixed component along the first direction. The lens carrier can be movable with respect to the magnet carrier on the plane defined by the second direction and the third direction. Therefore, it is favorable for providing the magnet carrier with the movement needed for auto-focusing and providing the lens carrier with the movement needed for image-stabilizing, which has relatively high space utilization efficiency so as to achieve miniaturization.

Moreover, the driving device can further include an auto focus magnet and an auto focus coil. The auto focus magnet can be disposed on the magnet carrier. The auto focus coil can be disposed on the fixed component. The auto focus coil can correspond to the auto focus magnet so as to provide a driving force for moving the magnet carrier along the first direction. Therefore, it is favorable for providing the imaging lens assembly with the driving force needed for achieving auto-focusing. Moreover, the auto focus magnet and the auto focus coil can be disposed at one edge of the driving device, and there can be additional magnetic component disposed for providing a preload force needed for assembling. Moreover, there can be a position sensing component disposed to provide circuit control, such that the imaging lens assembly can achieve the purpose of focus more quickly.

Moreover, the driving device can further include an image stabilization magnet and an image stabilization coil. The image stabilization magnet can be disposed on the lens carrier. The image stabilization coil can be disposed on the fixed component. The image stabilization coil can correspond to the image stabilization magnet so as to provide a driving force for moving the lens carrier on the plane defined by the second direction and the third direction. Therefore, it is favorable for providing the imaging lens assembly with the driving force needed for achieving image-stabilizing. Moreover, the image stabilization magnet and the image stabilization coil can be respectively disposed at two edges of the driving device, and there can be additional magnetic components disposed for providing preload forces needed for assembling. Moreover, there can be a position sensing component disposed to provide circuit control, such that the imaging lens assembly can achieve the purpose of image stabilization compensation more sensitively.

In some other embodiment, the third groove group can be provided by the fixed component, and the fourth groove group can be provided by the lens carrier. The magnet carrier can be movable with respect to the fixed component on the plane defined by the second direction and the third direction. The lens carrier can be movable with respect to the magnet carrier along the first direction. Therefore, it is favorable for providing the lens carrier with the movement needed for auto-focusing and providing the magnet carrier with the movement needed for image-stabilizing, which can reduce the total weight of moved components required for auto-focusing so as to achieve fast focus and low power consumption.

Moreover, the driving device can further include an auto focus magnet and an auto focus coil. The auto focus magnet can be disposed on the lens carrier. The auto focus coil can be disposed on the fixed component. The auto focus coil can correspond to the auto focus magnet so as to provide a driving force for moving the lens carrier along the first direction. Therefore, it is favorable for providing the imaging lens assembly with the driving force needed for achieving auto-focusing.

Moreover, the driving device can further include an image stabilization magnet and an image stabilization coil. The image stabilization magnet can be disposed on the magnet carrier. The image stabilization coil can be disposed on the fixed component. The image stabilization coil can correspond to the image stabilization magnet so as to provide a driving force for moving the magnet carrier on the plane defined by the second direction and the third direction. Therefore, it is favorable for providing the imaging lens assembly with the driving force needed for achieving image-stabilizing.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
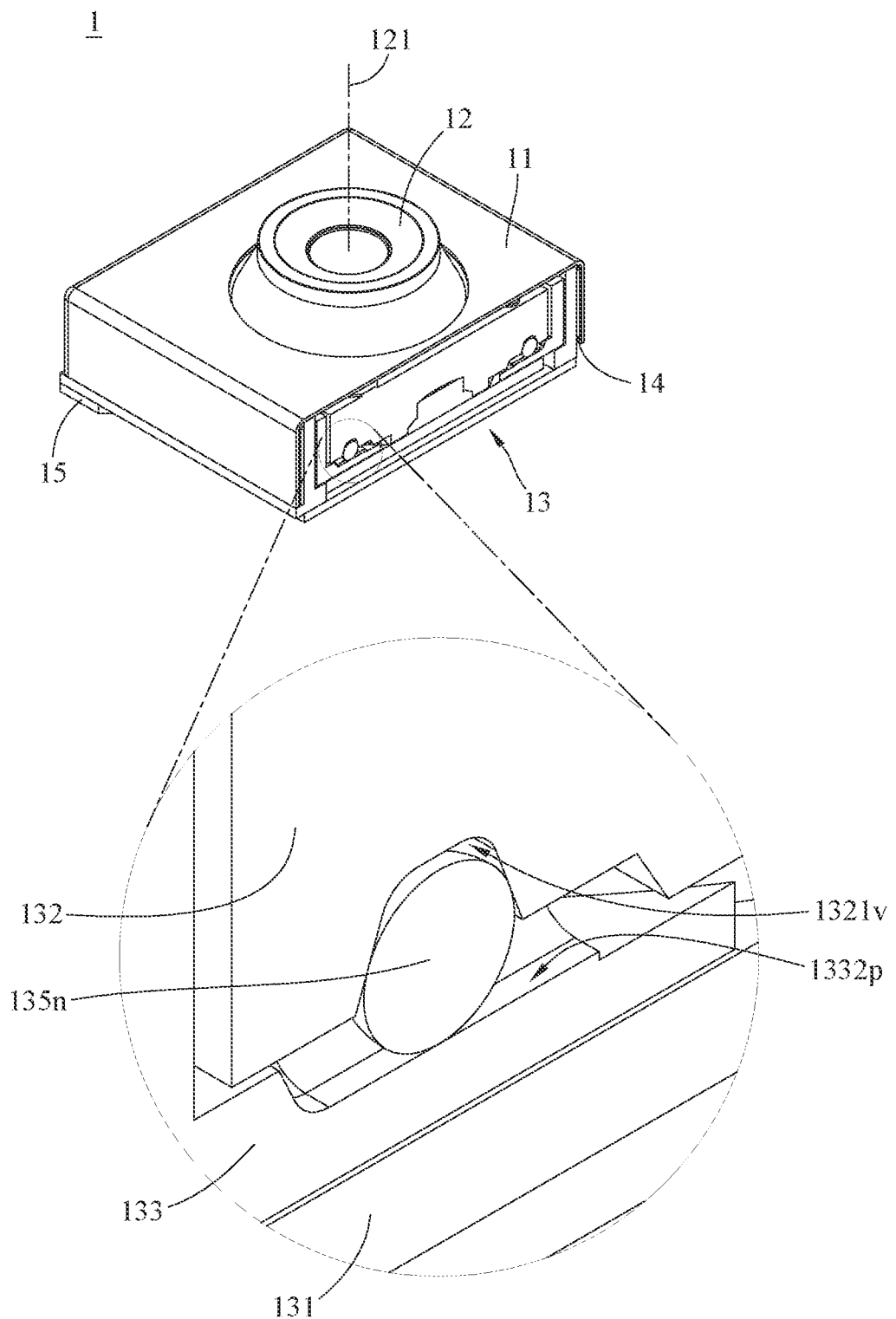
FIG. 2 is a schematic view of the camera module in FIG. 1 that has been sectioned.
Figure 3:
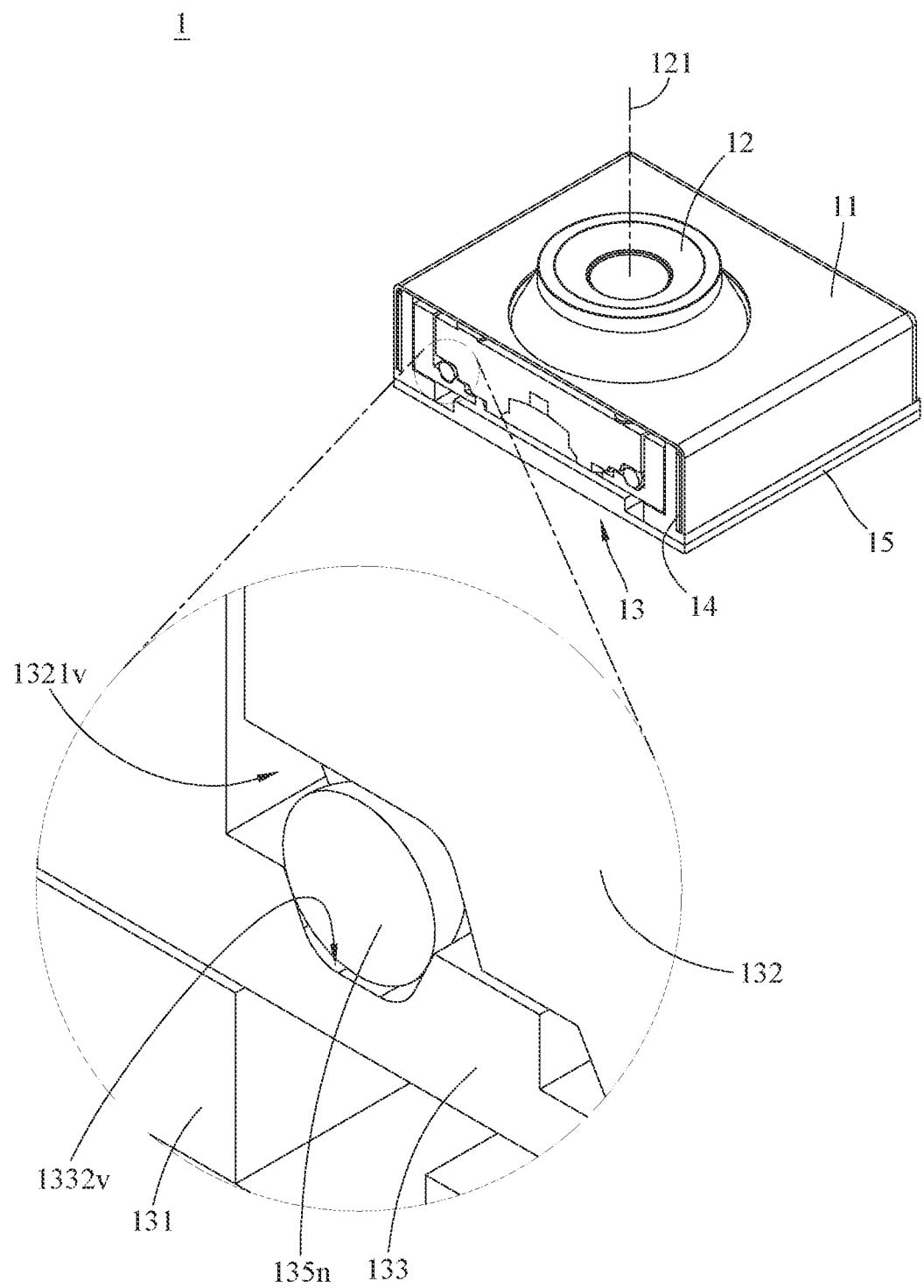
FIG. 3 is a schematic view of the camera module in FIG. 1 that has been sectioned in another manner.
Figure 4:
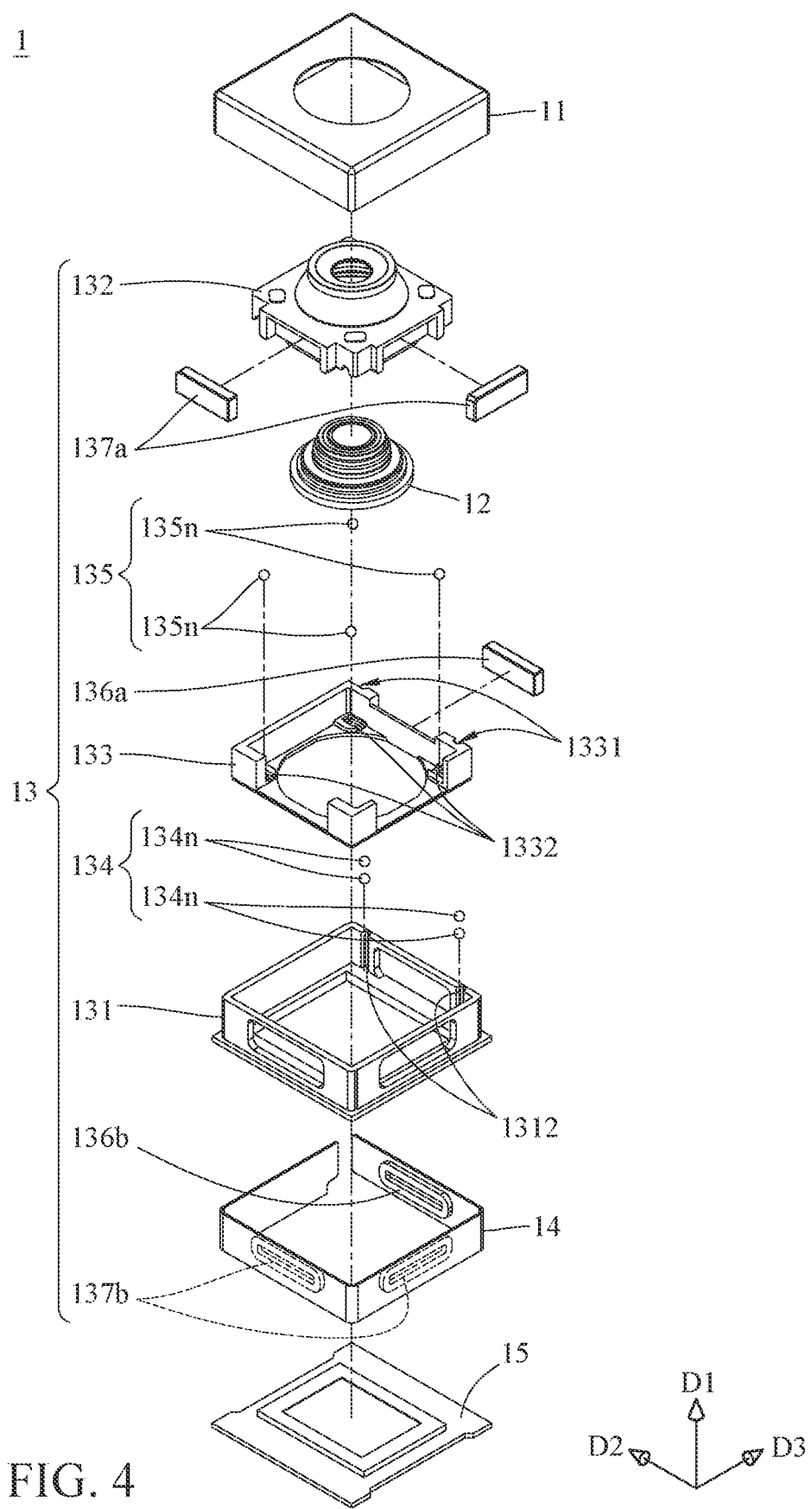
FIG. 4 is an exploded view of the camera module in FIG. 1.
Figure 5:
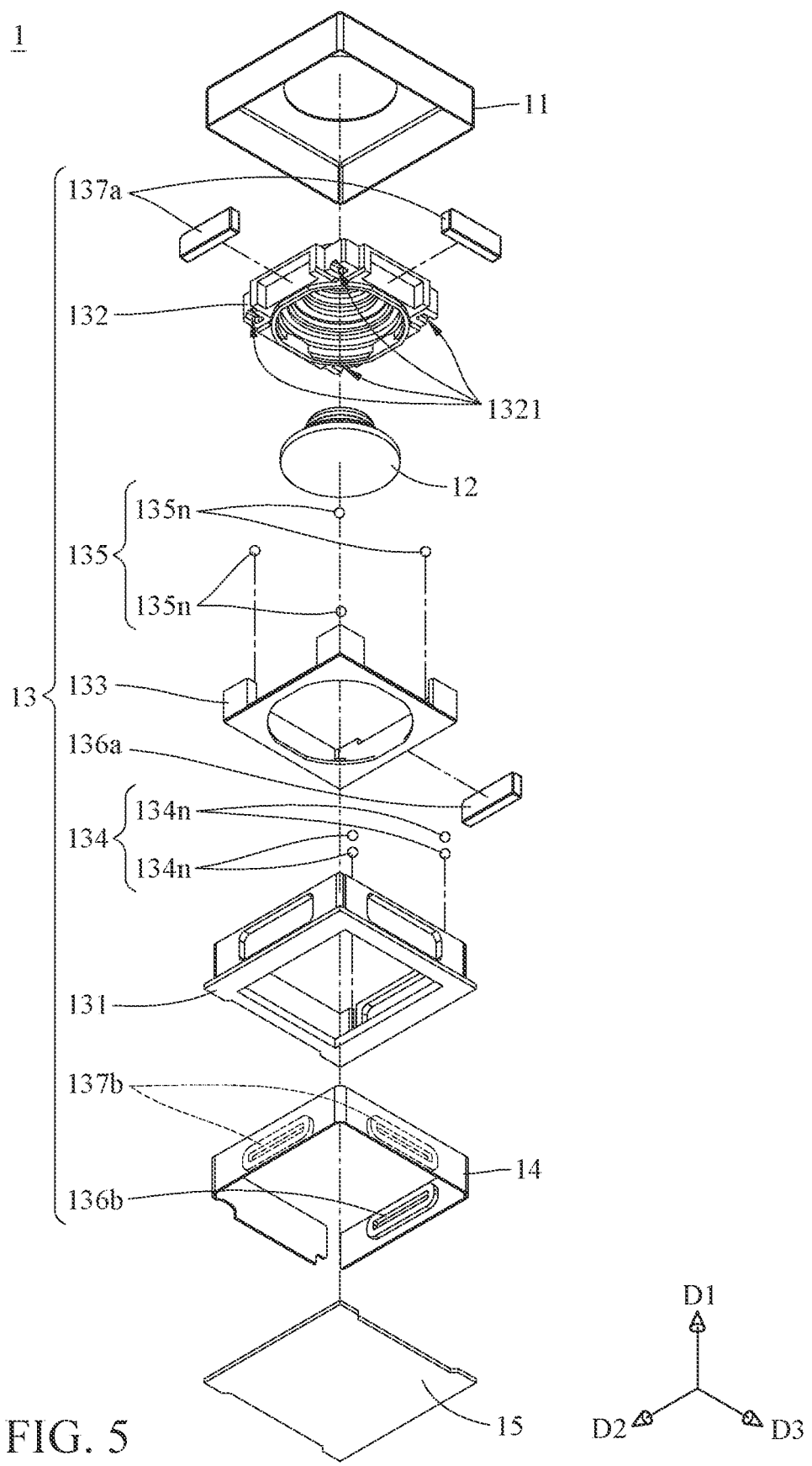
FIG. 5 is another exploded view of the camera module in FIG. 1.
Figure 6:
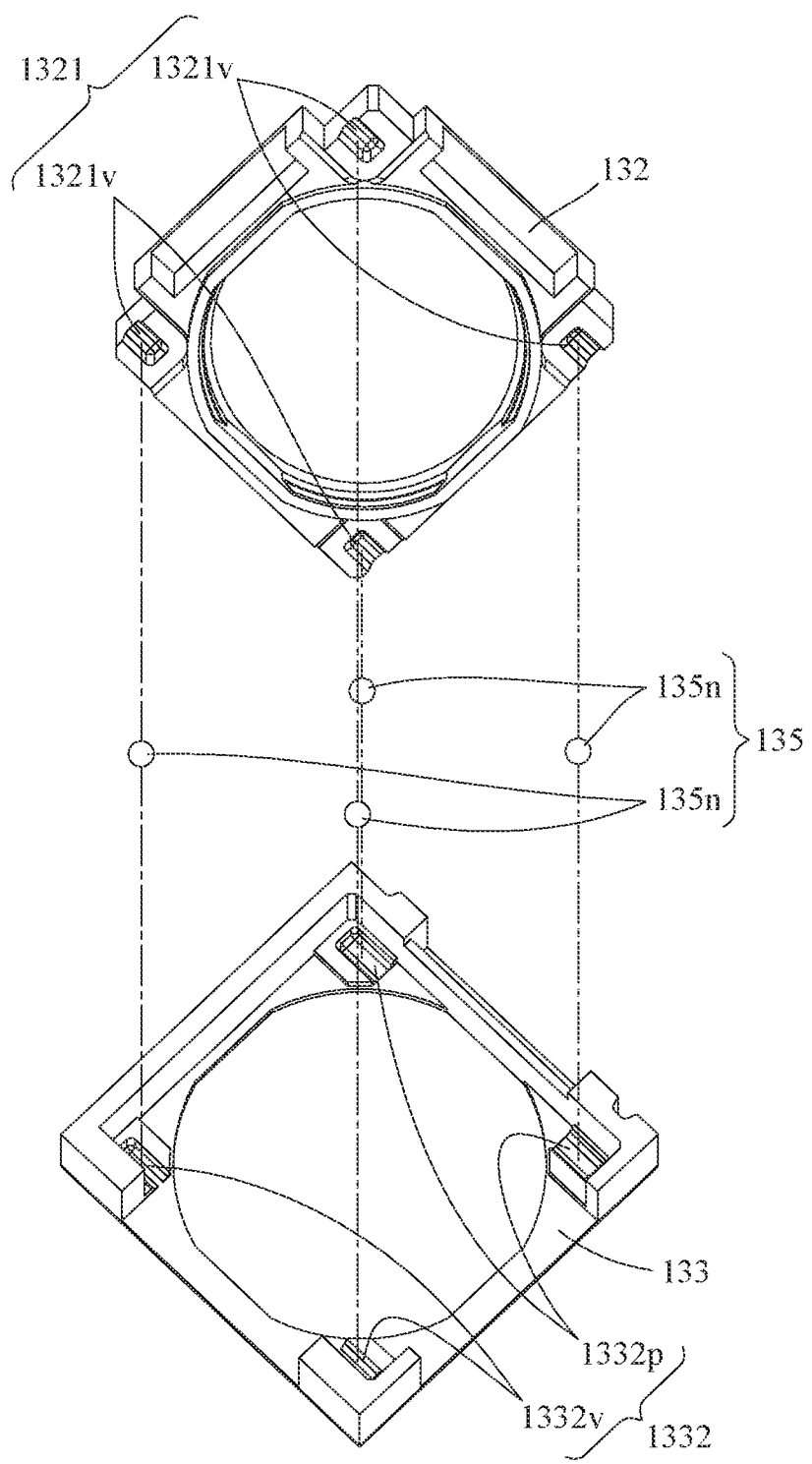
FIG. 6 is a schematic view showing the corresponding relationship between a lens carrier and a magnet carrier of the camera module in FIG. 1.

Please refer to FIG. 1 to FIG. 6, where FIG. 1 is a perspective view of a camera module according to the 1st embodiment of the present disclosure, FIG. 2 is a schematic view of the camera module in FIG. 1 that has been sectioned, FIG. 3 is a schematic view of the camera module in FIG. 1 that has been sectioned in another manner, FIG. 4 is an exploded view of the camera module in FIG. 1, FIG. 5 is another exploded view of the camera module in FIG. 1, and FIG. 6 is a schematic view showing the corresponding relationship between a lens carrier and a magnet carrier of the camera module in FIG. 1.

In this embodiment, a camera module 1 includes a casing 11, an imaging lens assembly 12, a driving device 13, a circuit component 14 and an image sensor 15. The casing 11 has an accommodation space (not numbered) for accommodating the imaging lens assembly 12, the driving device 13, the circuit component 14 and the image sensor 15. The imaging lens assembly 12 has an optical axis 121. The driving device 13 includes a fixed component 131, a lens carrier 132, a magnet carrier 133, a first ball group 134, a second ball group 135, an auto focus magnet 136a, an auto focus coil 136b, two image stabilization magnets 137a and two image stabilization coils 137b. The imaging lens assembly 12 is disposed in the lens carrier 132.

The magnet carrier 133 has a first groove group 1331 and a second groove group 1332. The first groove group 1331 extends along a first direction D1 parallel to the optical axis 121, and the second groove group 1332 extends along a second direction D2 perpendicular to the optical axis 121.

The lens carrier 132 has a third groove group 1321, and the fixed component 131 has a fourth groove group 1312. The third groove group 1321 extends along a third direction D3 being perpendicular to the optical axis 121 and being orthogonal to the second direction D2 and is disposed opposite to the second groove group 1332. The fourth groove group 1312 extends along the first direction D1 parallel to the optical axis 121 and is disposed opposite to the first groove group 1331.

The first ball group 134 includes four balls 134n disposed between the first groove group 1331 and the fourth groove group 1312. Accordingly, the magnet carrier 133 is movable with respect to the fixed component 131 along the first direction D1, such that the imaging lens assembly 12 is movable with respect to the fixed component 131 along the first direction D1 via the lens carrier 132, the magnet carrier 133 and the first ball group 134.

The second ball group 135 includes four balls 135n. The second groove group 1332 includes two strip V-shaped grooves 1332v and two U-shaped grooves 1332p, and the third groove group 1321 includes four strip V-shaped grooves 1321v. Two of the balls 135n are located between the second groove group 1332 and the third groove group 1321, and each of them is in one-point contact with respective U-shaped groove 1332p and in two-points contact with two of the strip V-shaped grooves 1321v, as shown in FIG. 2. The other two of the balls 135n are located between the second groove group 1332 and the third groove group 1321, and each of them is in two-points contact with respective strip V-shaped groove 1332v and the other two strip V-shaped grooves 1321v, as shown in FIG. 3. Accordingly, the lens carrier 132 is movable with respect to the magnet carrier 133 on a plane defined by the second direction D2 and the third direction D3, such that the imaging lens assembly 12 is movable with respect to the fixed component 131 on the plane defined by the second direction D2 and the third direction D3 via the lens carrier 132 and the second ball group 135.

The auto focus magnet 136a is disposed at an edge of the magnet carrier 133. The auto focus coil 136b is indirectly disposed at an edge of the fixed component 131 via the circuit component 14. The auto focus coil 136b corresponds to the auto focus magnet 136a so as to provide a driving force for moving the magnet carrier 133 along the first direction D1.

The image stabilization magnets 137a are disposed at two edges of the lens carrier 132. The image stabilization coils 137b are indirectly disposed at two edges of the fixed component 131 via the circuit component 14. The image stabilization coils 137b correspond to the image stabilization magnets 137a so as to provide a driving force for moving the lens carrier 132 on the plane defined by the second direction D2 and the third direction D3.

The circuit component 14 is disposed on the fixed component 131. The circuit component 14 is electrically connected to the auto focus coil 136b and the image stabilization coils 137b so as to send a controlling signal to the auto focus coil 136b and the image stabilization coils 137b.

The image sensor 15 is disposed on an image surface (not shown) of the imaging lens assembly 12 so as to receive an optical image signal imaged on the image surface through the imaging lens assembly 12, and the image sensor 15 enables the conversion of the optical image signal into an electric image signal served as image data to be outputted.

2nd Embodiment

Figure 7:
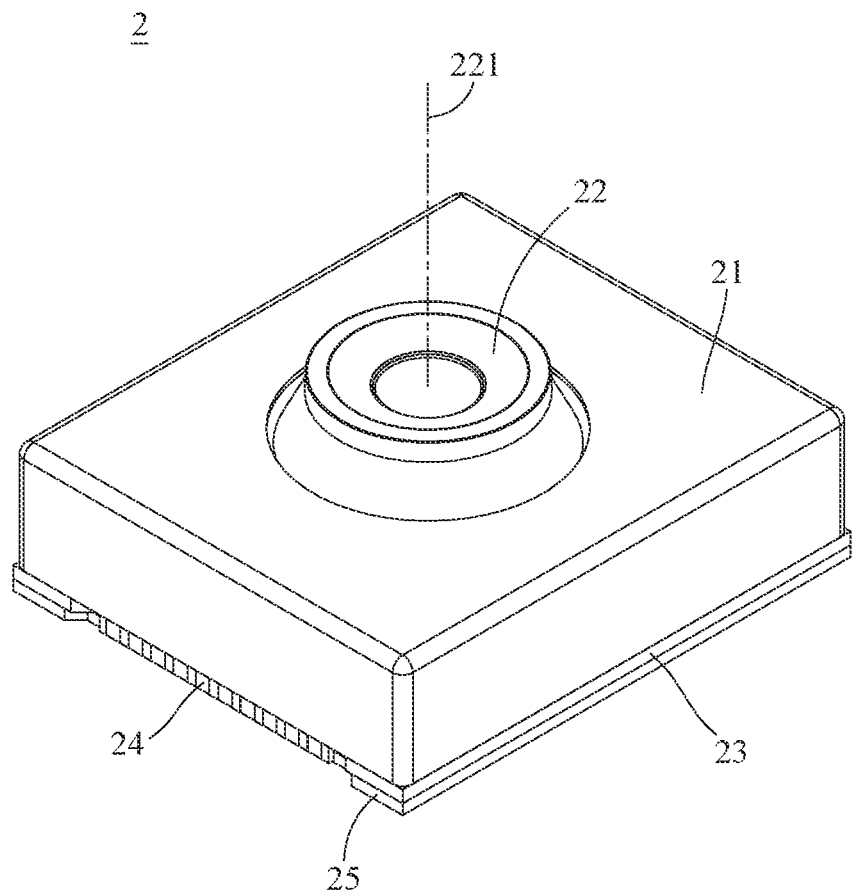
FIG. 7 is a perspective view of a camera module according to the 2nd embodiment of the present disclosure.
Figure 8:
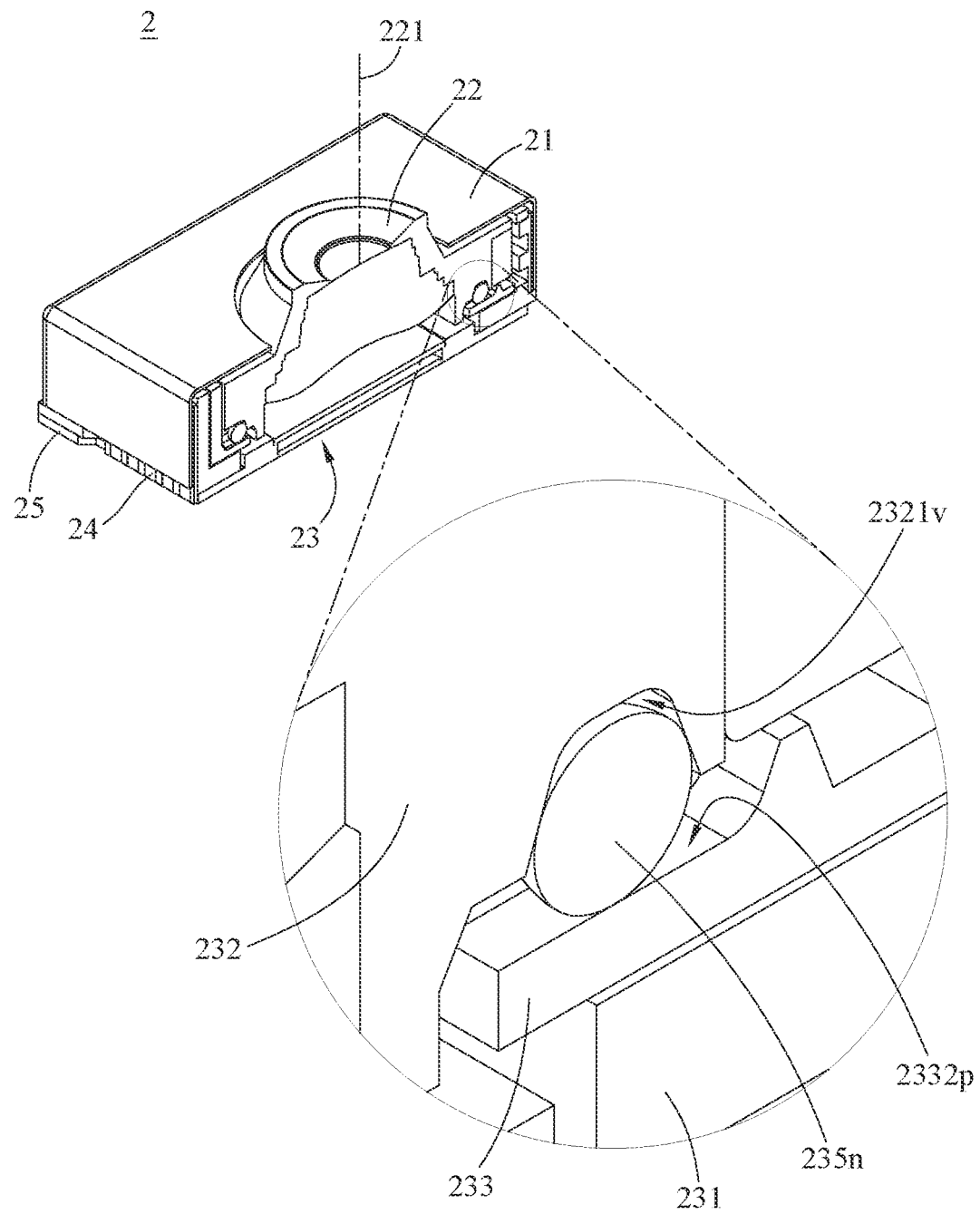
FIG. 8 is a schematic view of the camera module in FIG. 7 that has been sectioned.
Figure 9:
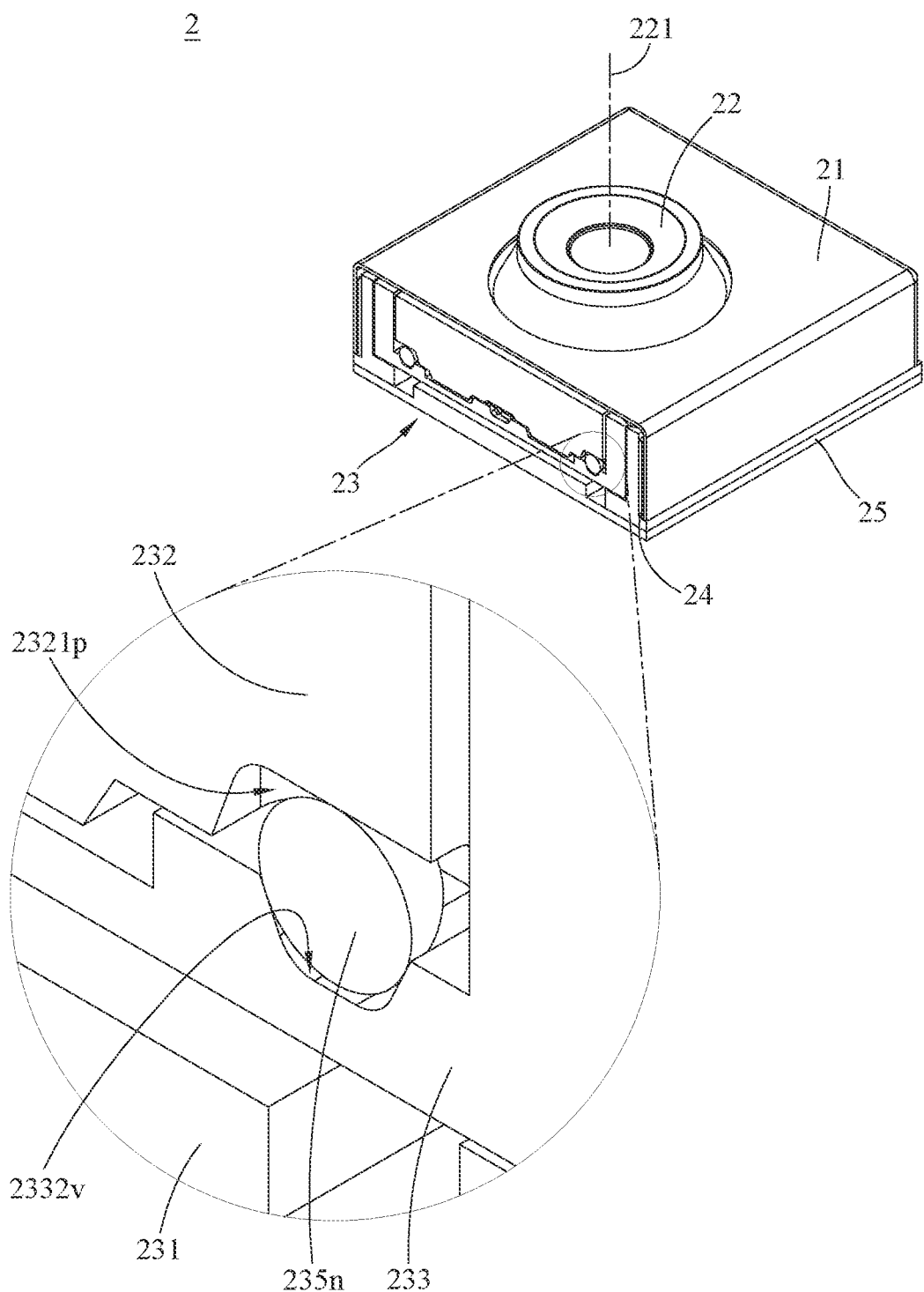
FIG. 9 is a schematic view of the camera module in FIG. 7 that has been sectioned in another manner.
Figure 10:
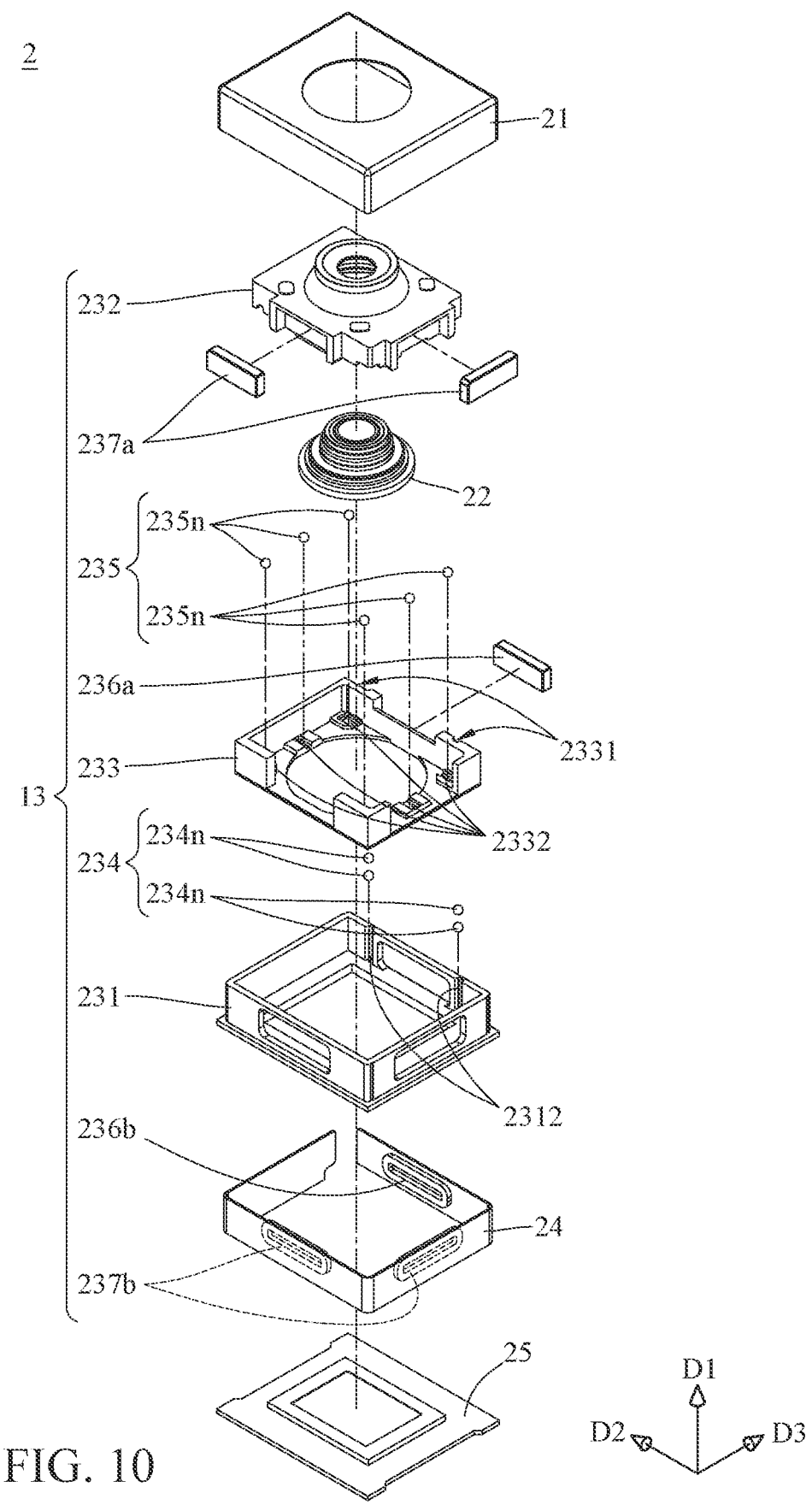
FIG. 10 is an exploded view of the camera module in FIG. 7.
Figure 11:
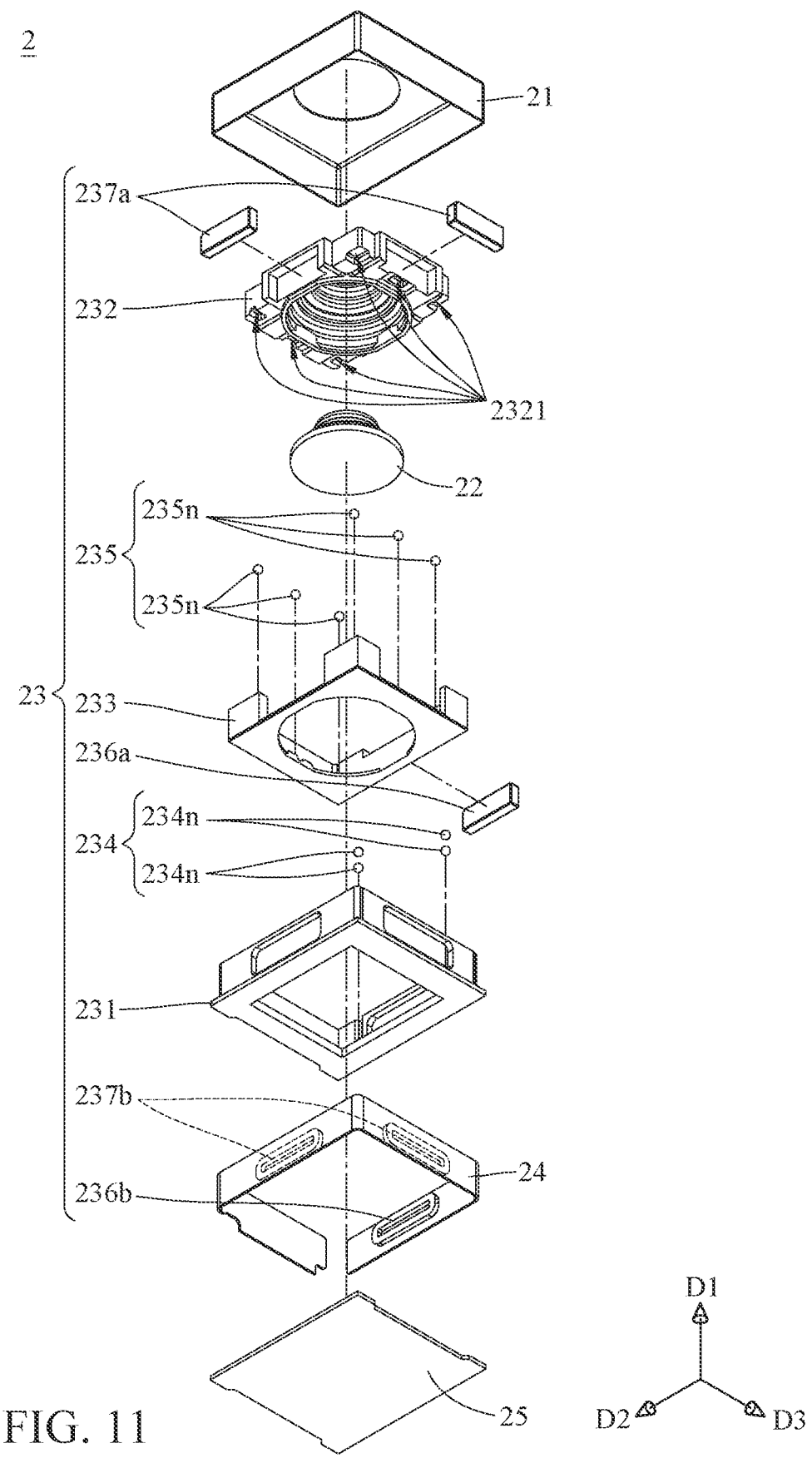
FIG. 11 is another exploded view of the camera module in FIG. 7.
Figure 12:
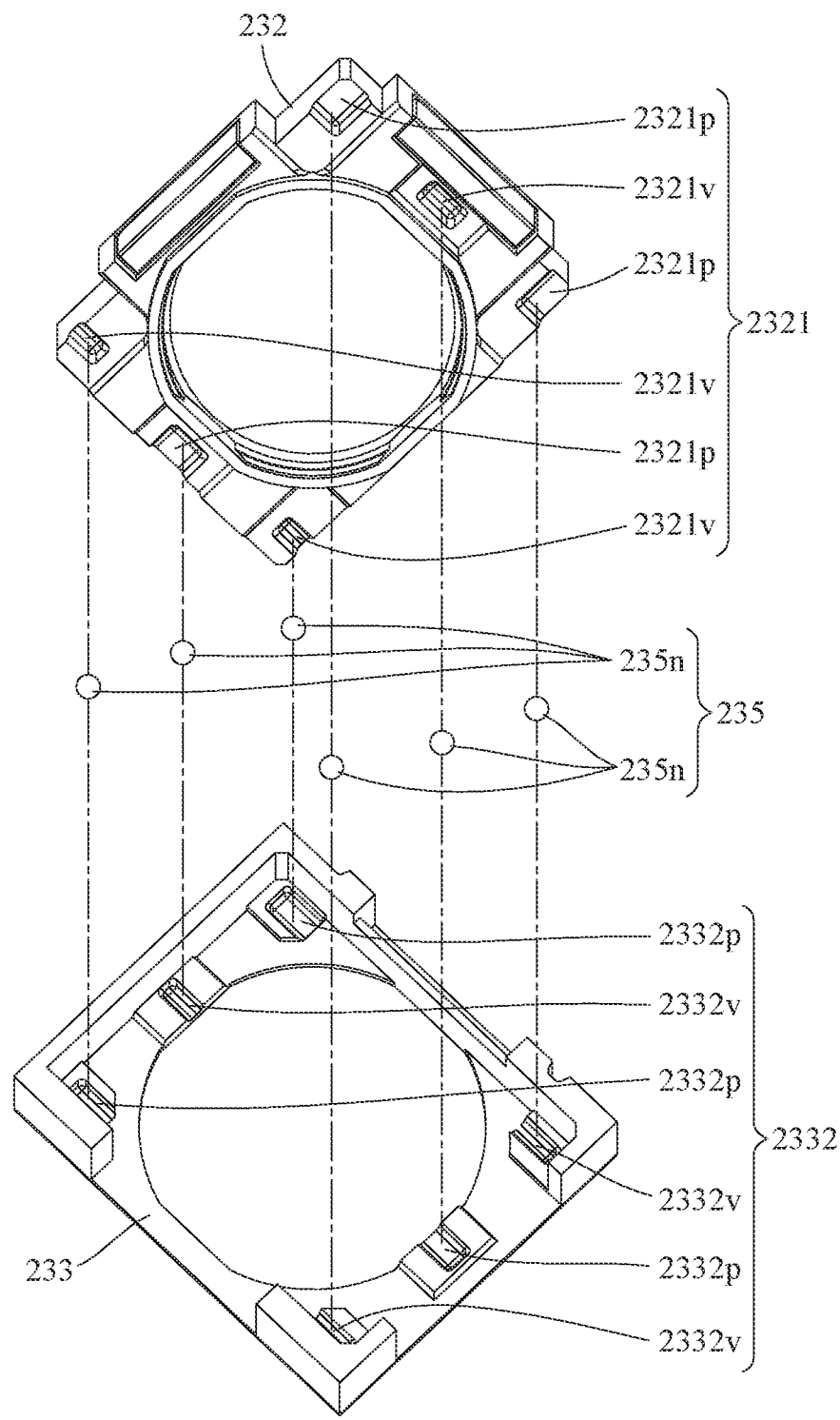
FIG. 12 is a schematic view showing the corresponding relationship between a lens carrier and a magnet carrier of the camera module in FIG. 7.

Please refer to FIG. 7 to FIG. 12, where FIG. 7 is a perspective view of a camera module according to the 2nd embodiment of the present disclosure, FIG. 8 is a schematic view of the camera module in FIG. 7 that has been sectioned, FIG. 9 is a schematic view of the camera module in FIG. 7 that has been sectioned in another manner, FIG. 10 is an exploded view of the camera module in FIG. 7, FIG. 11 is another exploded view of the camera module in FIG. 7, and FIG. 12 is a schematic view showing the corresponding relationship between a lens carrier and a magnet carrier of the camera module in FIG. 7.

In this embodiment, a camera module 2 includes a casing 21, an imaging lens assembly 22, a driving device 23, a circuit component 24 and an image sensor 25. The casing 21 has an accommodation space (not numbered) for accommodating the imaging lens assembly 22, the driving device 23, the circuit component 24 and the image sensor 25. The imaging lens assembly 22 has an optical axis 221. The driving device 23 includes a fixed component 231, a lens carrier 232, a magnet carrier 233, a first ball group 234, a second ball group 235, an auto focus magnet 236a, an auto focus coil 236b, two image stabilization magnets 237a and two image stabilization coils 237b. The imaging lens assembly 22 is disposed in the lens carrier 232.

The magnet carrier 233 has a first groove group 2331 and a second groove group 2332. The first groove group 2331 extends along a first direction D1 parallel to the optical axis 221, and the second groove group 2332 extends along a second direction D2 perpendicular to the optical axis 221.

The lens carrier 232 has a third groove group 2321, and the fixed component 231 has a fourth groove group 2312. The third groove group 2321 extends along a third direction D3 being perpendicular to the optical axis 221 and being orthogonal to the second direction D2 and is disposed opposite to the second groove group 2332. The fourth groove group 2312 extends along the first direction D1 parallel to the optical axis 221 and is disposed opposite to the first groove group 2331.

The first ball group 234 includes four balls 234n disposed between the first groove group 2331 and the fourth groove group 2312. Accordingly, the magnet carrier 233 is movable with respect to the fixed component 231 along the first direction D1, such that the imaging lens assembly 22 is movable with respect to the fixed component 231 along the first direction D1 via the lens carrier 232, the magnet carrier 233 and the first ball group 234.

The second ball group 235 includes six balls 235n. The second groove group 2332 includes three strip V-shaped grooves 2332v and three U-shaped grooves 2332p, and the third groove group 2321 includes three strip V-shaped grooves 2321v and three U-shaped grooves 2321p. Three of the balls 235n are located between the second groove group 2332 and the third groove group 2321, and each of them is in two-points contact with respective strip V-shaped groove 2332v and in one-point contact with respective U-shaped groove 2321p, as shown in FIG. 8. The other three of the balls 235n are located between the second groove group 2332 and the third groove group 2321, and each of them is in one-point contact with respective U-shaped groove 2332p and in two-points contact with respective strip V-shaped groove 2321v, as shown in FIG. 9. Accordingly, the lens carrier 232 is movable with respect to the magnet carrier 233 on a plane defined by the second direction D2 and the third direction D3, such that the imaging lens assembly 22 is movable with respect to the fixed component 231 on the plane defined by the second direction D2 and the third direction D3 via the lens carrier 232 and the second ball group 235.

The auto focus magnet 236a is disposed at an edge of the magnet carrier 233. The auto focus coil 236b is indirectly disposed at an edge of the fixed component 231 via the circuit component 24. The auto focus coil 236b corresponds to the auto focus magnet 236a so as to provide a driving force for moving the magnet carrier 233 along the first direction D1.

The image stabilization magnets 237a are disposed at two edges of the lens carrier 232. The image stabilization coils 237b are indirectly disposed at two edges of the fixed component 231 via the circuit component 24. The image stabilization coils 237b correspond to the image stabilization magnets 237a so as to provide a driving force for moving the lens carrier 232 on the plane defined by the second direction D2 and the third direction D3.

The circuit component 24 is disposed on the fixed component 231. The circuit component 24 is electrically connected to the auto focus coil 236b and the image stabilization coils 237b so as to send a controlling signal to the auto focus coil 236b and the image stabilization coils 237b.

The image sensor 25 is disposed on an image surface (not shown) of the imaging lens assembly 22 so as to receive an optical image signal imaged on the image surface through the imaging lens assembly 22, and the image sensor 25 enables the conversion of the optical image signal into an electric image signal served as image data to be outputted.

3rd Embodiment

Figure 13:
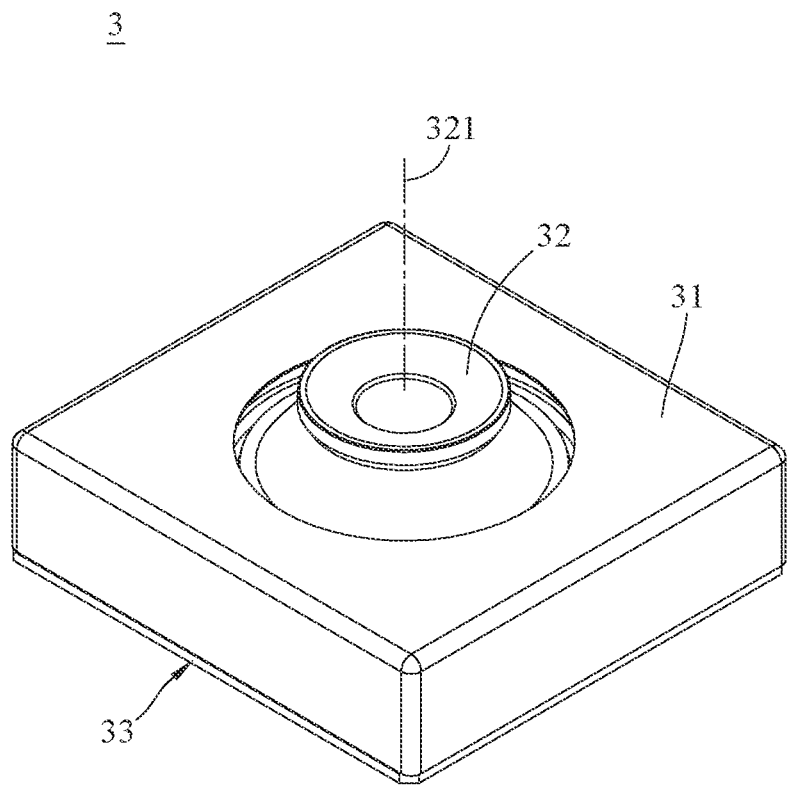
FIG. 13 is a perspective view of a camera module according to the 3rd embodiment of the present disclosure.
Figure 14:
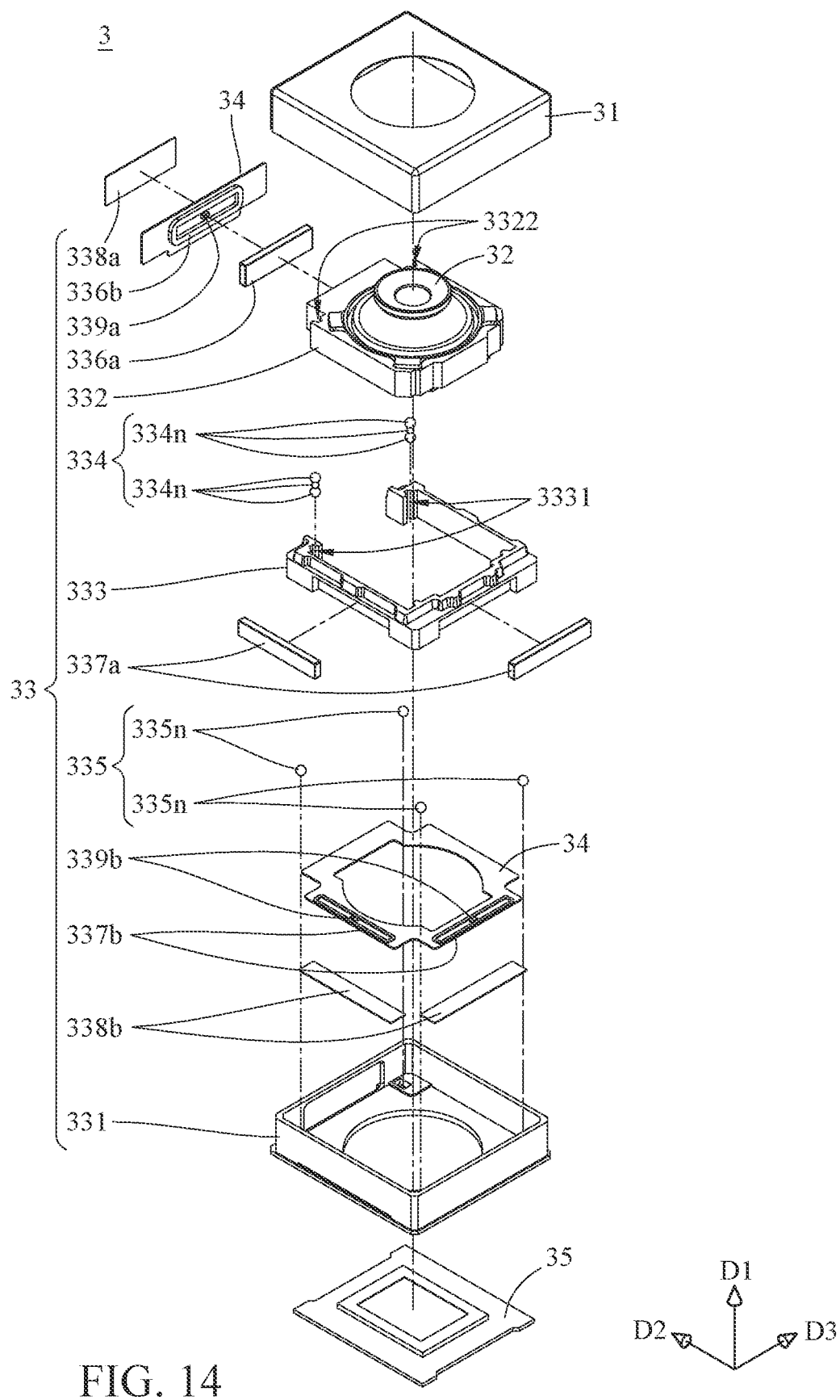
FIG. 14 is an exploded view of the camera module in FIG. 13.
Figure 15:
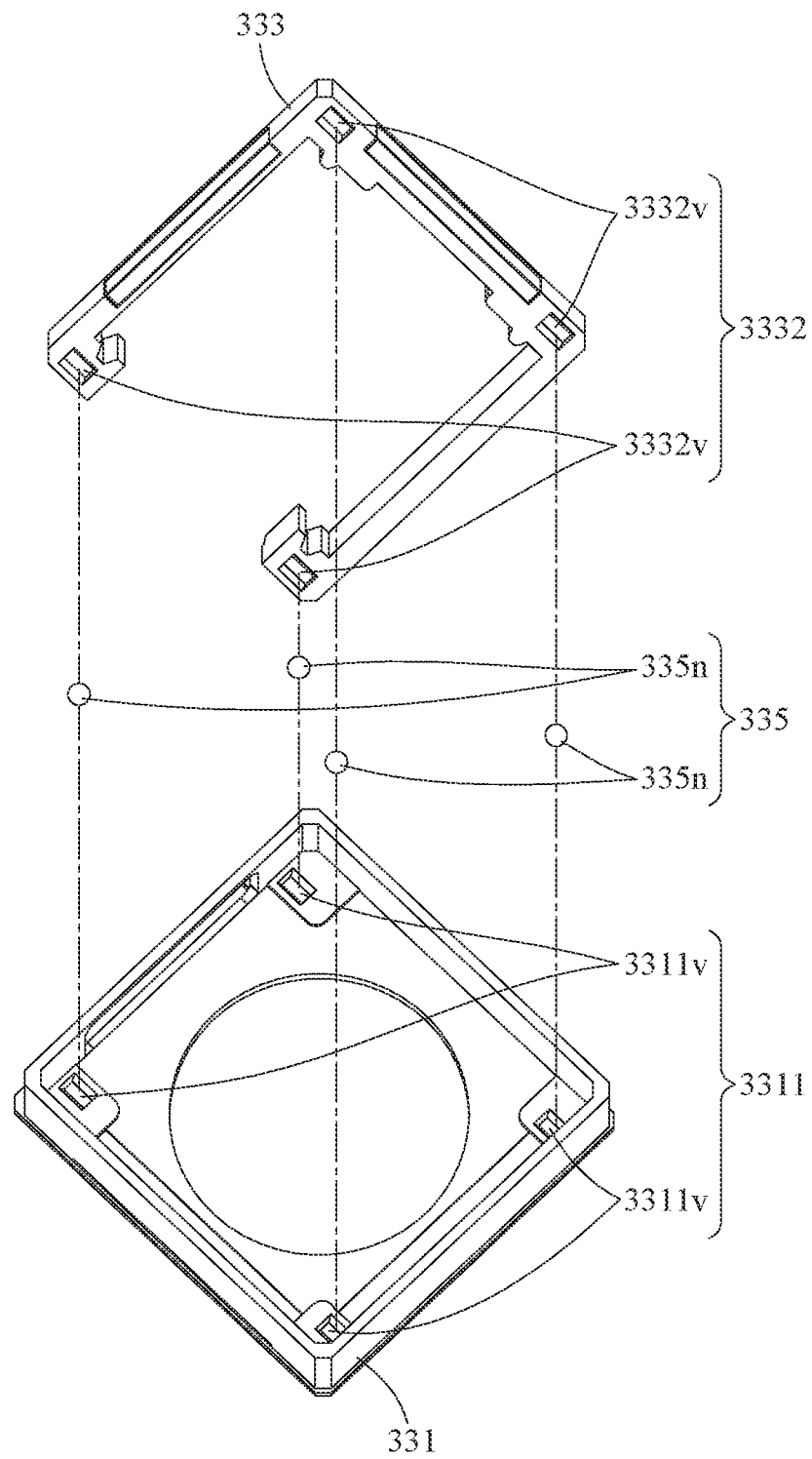
FIG. 15 is a schematic view showing the corresponding relationship between a magnet carrier and a fixed component of the camera module in FIG. 13.

Please refer to FIG. 13 to FIG. 15, where FIG. 13 is a perspective view of a camera module according to the 3rd embodiment of the present disclosure, FIG. 14 is an exploded view of the camera module in FIG. 13, and FIG. 15 is a schematic view showing the corresponding relationship between a magnet carrier and a fixed component of the camera module in FIG. 13.

In this embodiment, a camera module 3 includes a casing 31, an imaging lens assembly 32, a driving device 33, two circuit components 34 and an image sensor 35. The casing 31 has an accommodation space (not numbered) for accommodating the imaging lens assembly 32, the driving device 33, the circuit components 34 and the image sensor 35. The imaging lens assembly 32 has an optical axis 321. The driving device 33 includes a fixed component 331, a lens carrier 332, a magnet carrier 333, a first ball group 334, a second ball group 335, an auto focus magnet 336a, an auto focus coil 336b, two image stabilization magnets 337a, two image stabilization coils 337b, a first magnetic component 338a, two second magnetic components 338b, a first position sensing component 339a and two second position sensing components 339b. The imaging lens assembly 32 is disposed in the lens carrier 332.

The magnet carrier 333 has a first groove group 3331 and a second groove group 3332. The first groove group 3331 extends along a first direction D1 parallel to the optical axis 321, and the second groove group 3332 extends along a second direction D2 perpendicular to the optical axis 321.

The fixed component 331 has a third groove group 3311, and the lens carrier 332 has a fourth groove group 3322. The third groove group 3311 extends along a third direction D3 being perpendicular to the optical axis 321 and being orthogonal to the second direction D2 and is disposed opposite to the second groove group 3332. The fourth groove group 3322 extends along the first direction D1 parallel to the optical axis 321 and is disposed opposite to the first groove group 3331.

The first ball group 334 includes six balls 334n disposed between the first groove group 3331 and the fourth groove group 3322. Accordingly, the lens carrier 332 is movable with respect to the magnet carrier 333 along the first direction D1, such that the imaging lens assembly 32 is movable with respect to the fixed component 331 along the first direction D1 via the lens carrier 332 and the first ball group 334.

The second ball group 335 includes four balls 335n. The second groove group 3332 includes four strip V-shaped grooves 3332v, and the third groove group 3311 includes four strip V-shaped grooves 3321v. The balls 335n are located between the second groove group 3332 and the third groove group 3311, and each of them is in two-points contact with respective strip V-shaped groove 3332v and respective strip V-shaped groove 3311v. Accordingly, the magnet carrier 333 is movable with respect to the fixed component 331 on a plane defined by the second direction D2 and the third direction D3, such that the imaging lens assembly 32 is movable with respect to the fixed component 331 on the plane defined by the second direction D2 and the third direction D3 via the lens carrier 332, the magnet carrier 333 and the second ball group 335.

The auto focus magnet 336a is disposed at an edge of the lens carrier 332. The auto focus coil 336b is indirectly disposed at an edge of the fixed component 331 via one of the circuit components 34. The auto focus coil 336b corresponds to the auto focus magnet 336a so as to provide a driving force for moving the lens carrier 332 along the first direction D1.

The first magnetic component 338a is disposed to correspond to the auto focus magnet 336a and the auto focus coil 336b so as to provide a preload force needed for assembling. The first position sensing component 339a is disposed in the auto focus coil 336b so as to provide circuit control.

The image stabilization magnets 337a are disposed at two edges of the magnet carrier 333. The image stabilization coils 337b are indirectly disposed at two edges of the fixed component 331 via the other circuit component 34. The image stabilization coils 337b correspond to the image stabilization magnets 337a so as to provide a driving force for moving the magnet carrier 333 on the plane defined by the second direction D2 and the third direction D3.

The second magnetic components 338b are disposed to correspond to the image stabilization magnets 337a and the image stabilization coils 337b so as to provide a preload force needed for assembling. The second position sensing components 339b are respectively disposed in the image stabilization coils 337b so as to provide circuit control.

The circuit components 34 are disposed on the fixed component 331. The circuit components 34 are electrically connected to the auto focus coil 336b and the image stabilization coils 337b so as to send a controlling signal to the auto focus coil 336b and the image stabilization coils 337b.

The image sensor 35 is disposed on an image surface (not shown) of the imaging lens assembly 32 so as to receive an optical image signal imaged on the image surface through the imaging lens assembly 32, and the image sensor 35 enables the conversion of the optical image signal into an electric image signal served as image data to be outputted.

4th Embodiment

Figure 16:
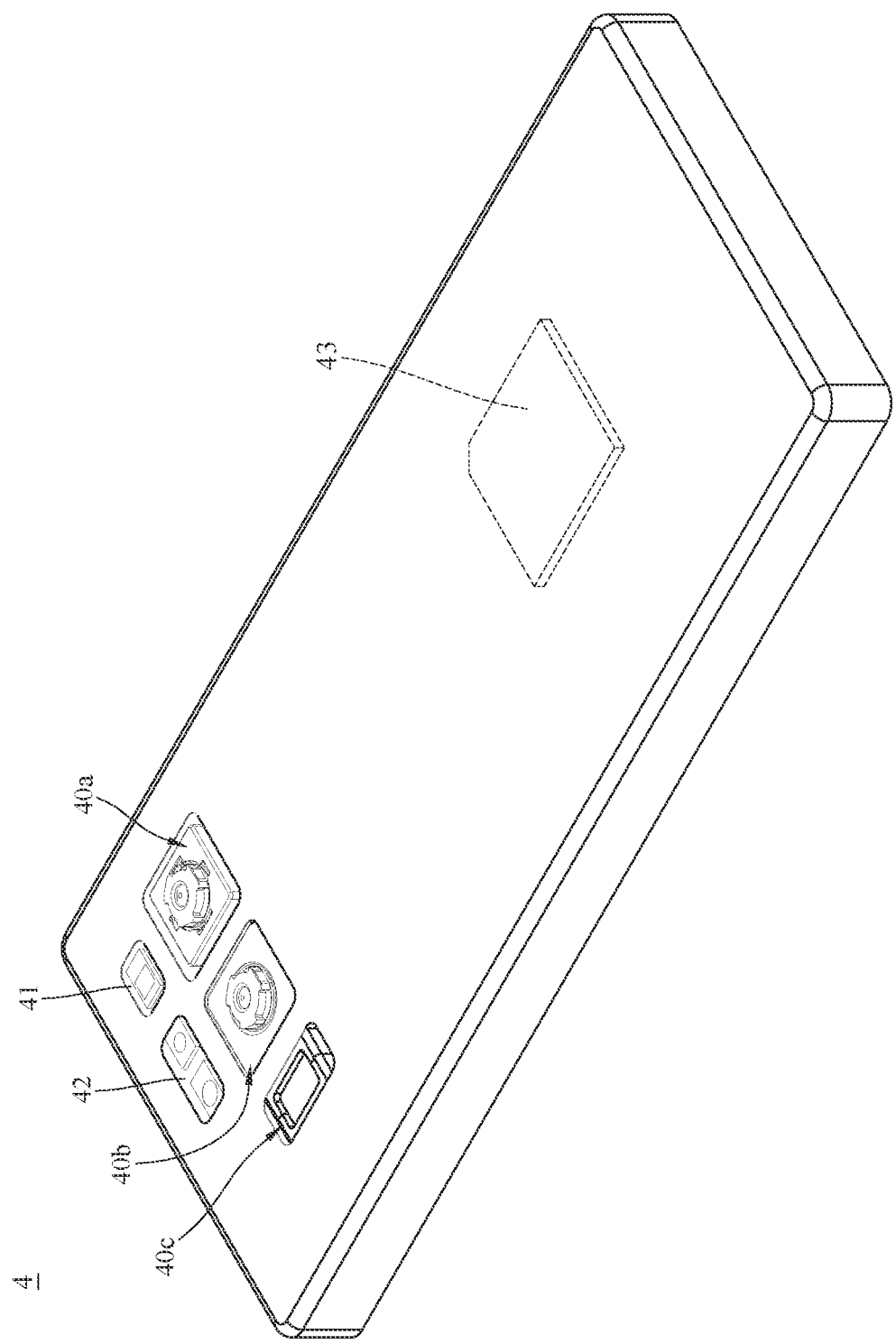
FIG. 16 is one perspective view of an electronic device according to the 4th embodiment of the present disclosure.
Figure 17:
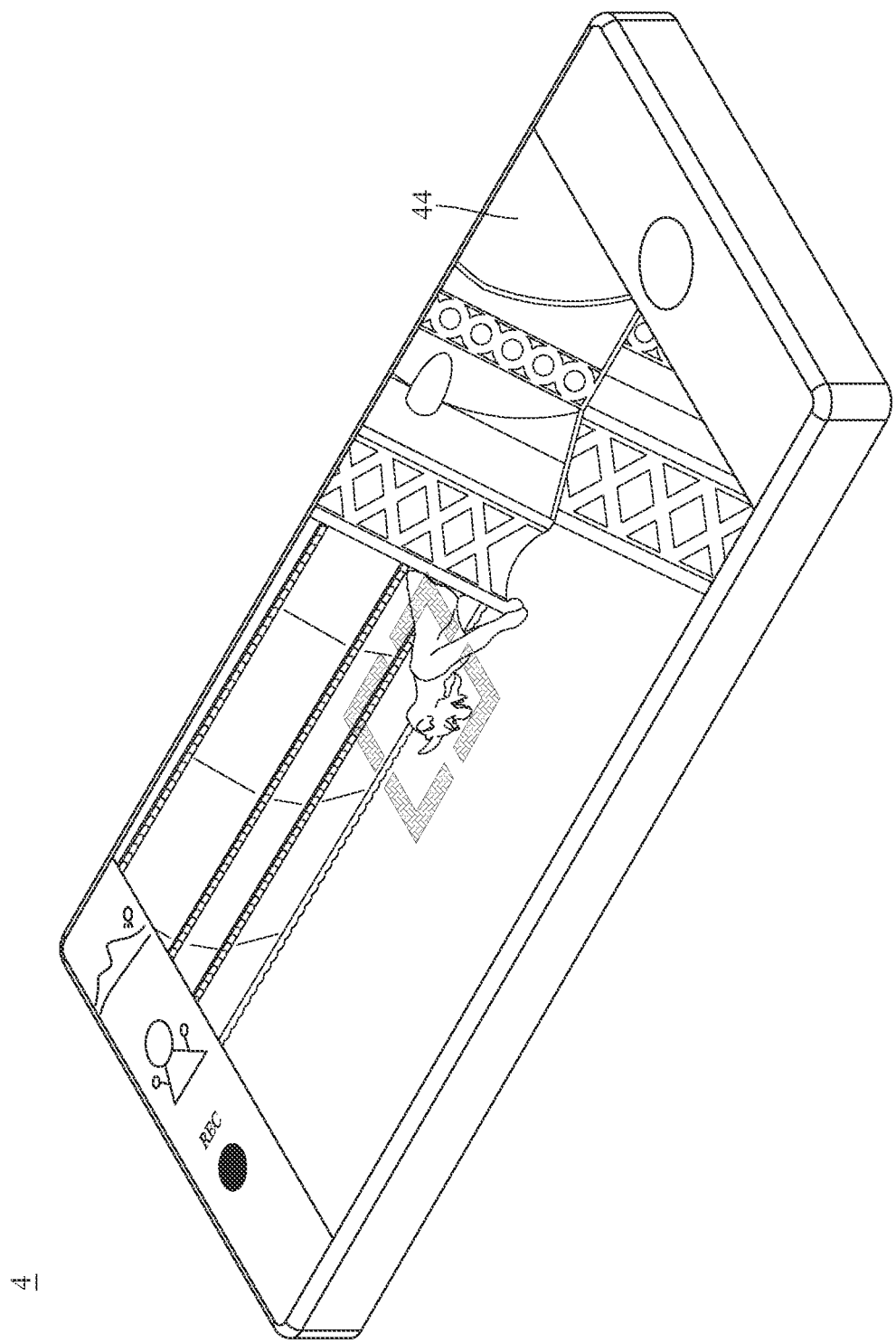
FIG. 17 is another perspective view of the electronic device in FIG. 16.

Please refer to FIG. 16 and FIG. 17. FIG. 16 is one perspective view of an electronic device according to the 4th embodiment of the present disclosure, and FIG. 17 is another perspective view of the electronic device in FIG. 16.

In this embodiment, the electronic device 4 is a smartphone including a plurality of camera modules, a flash module 41, a focus assist module 42, an image signal processor 43, a display module (user interface) 44 and an image software processor (not shown).

The camera modules include an ultra-wide-angle camera module 40a, a high pixel camera module 40b and a telephoto camera module 40c. Moreover, at least one of the camera modules 40a, 40b and 40c includes the camera module of the present disclosure.

Figure 18:
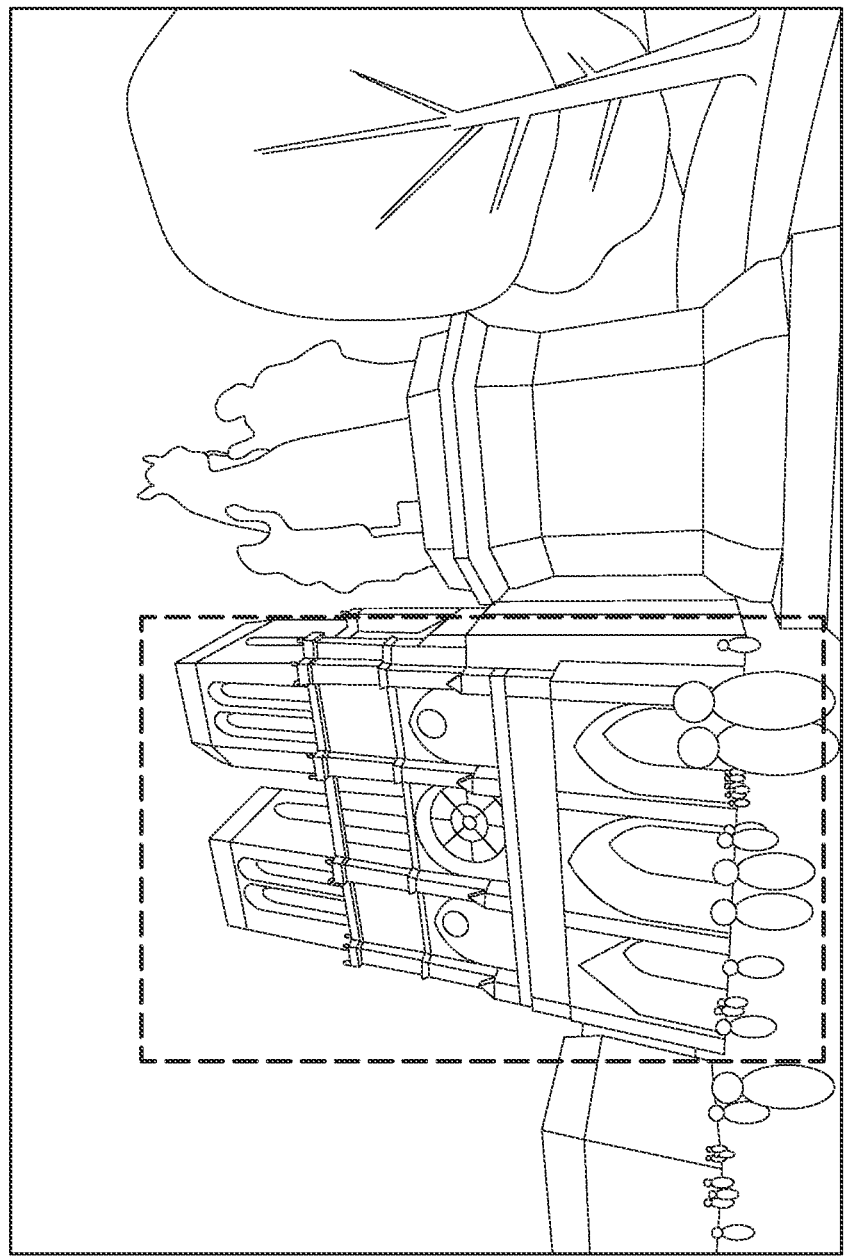
FIG. 18 is an image captured by the ultra-wide-angle camera module.

The image captured by the ultra-wide-angle camera module 40a enjoys a feature of multiple imaged objects. FIG. 18 is an image captured by the ultra-wide-angle camera module 40a.

Figure 19:
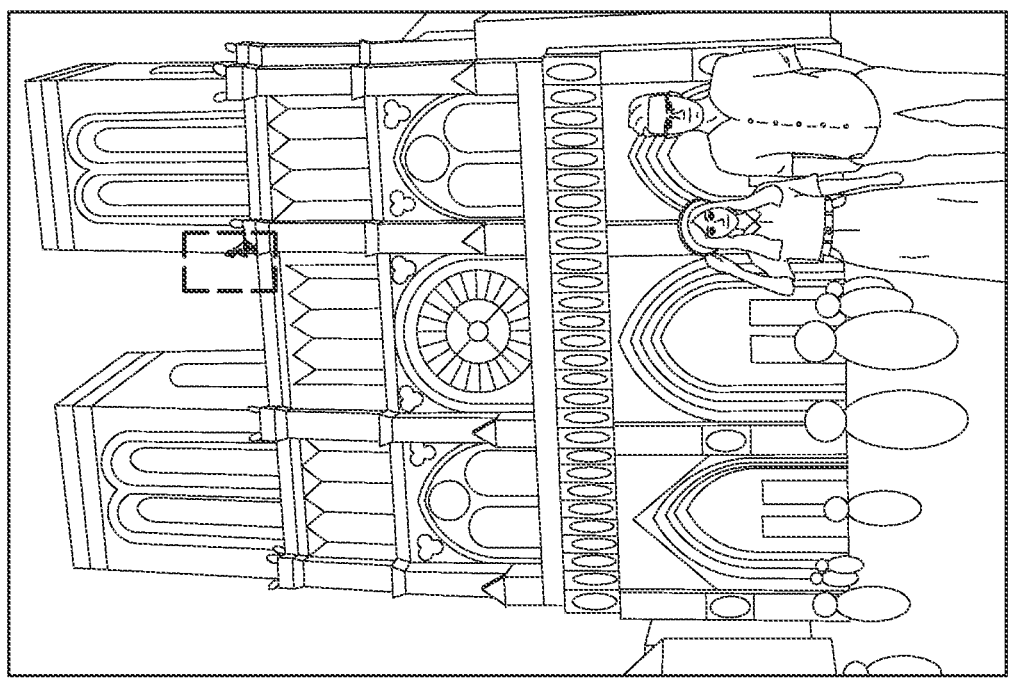
FIG. 19 is an image captured by the high pixel camera module.

The image captured by the high pixel camera module 40b enjoys a feature of high resolution and less distortion, and the high pixel camera module 40b can capture part of the image in FIG. 18. FIG. 19 is an image captured by the high pixel camera module 40b.

Figure 20:
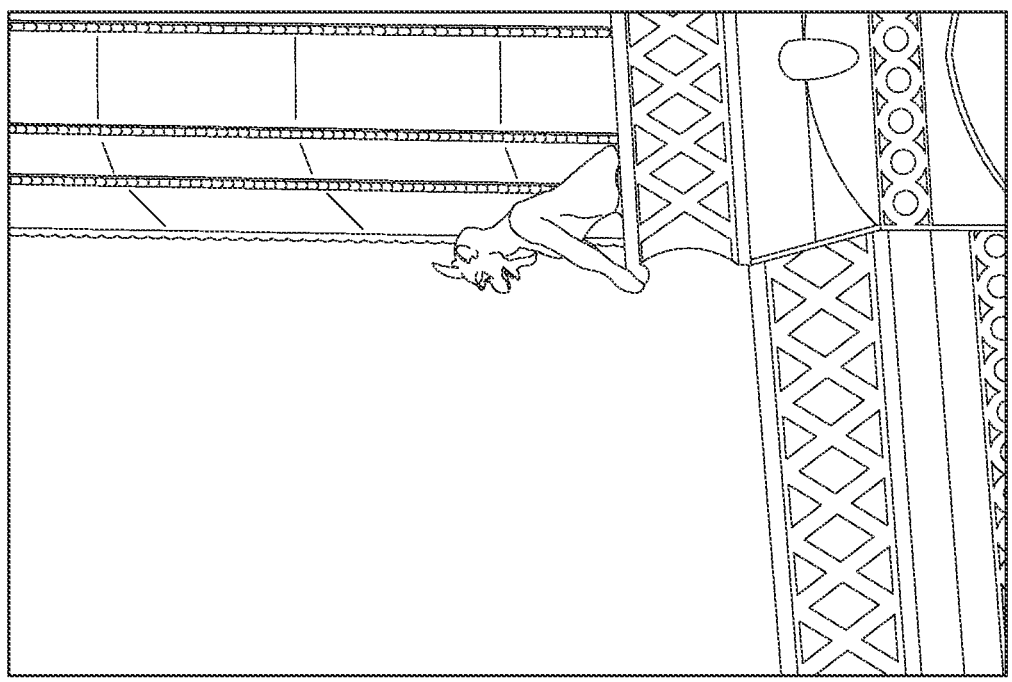
FIG. 20 is an image captured by the telephoto camera module.

The image captured by the telephoto camera module 40c enjoys a feature of high optical magnification, and the telephoto camera module 40c can capture part of the image in FIG. 19. FIG. 20 is an image captured by the telephoto camera module 40c.

When a user captures images of an object, the light rays converge in the ultra-wide-angle camera module 40a, the high pixel camera module 40b or the telephoto camera module 40c to generate images, and the flash module 41 is activated for light supplement. The focus assist module 42 detects the object distance of the imaged object to achieve fast auto focusing. The image signal processor 43 is configured to optimize the captured image to improve image quality and provided zooming function. The light beam emitted from the focus assist module 42 can be either conventional infrared or laser. The display module 44 can include a touch screen, and the user is able to interact with the display module 44 to adjust the angle of view and switch between different camera modules, and the image software processor having multiple functions to capture images and complete image processing. Alternatively, the user may capture images via a physical button. The image processed by the image software processor can be displayed on the display module 44.

5th Embodiment

Figure 21:
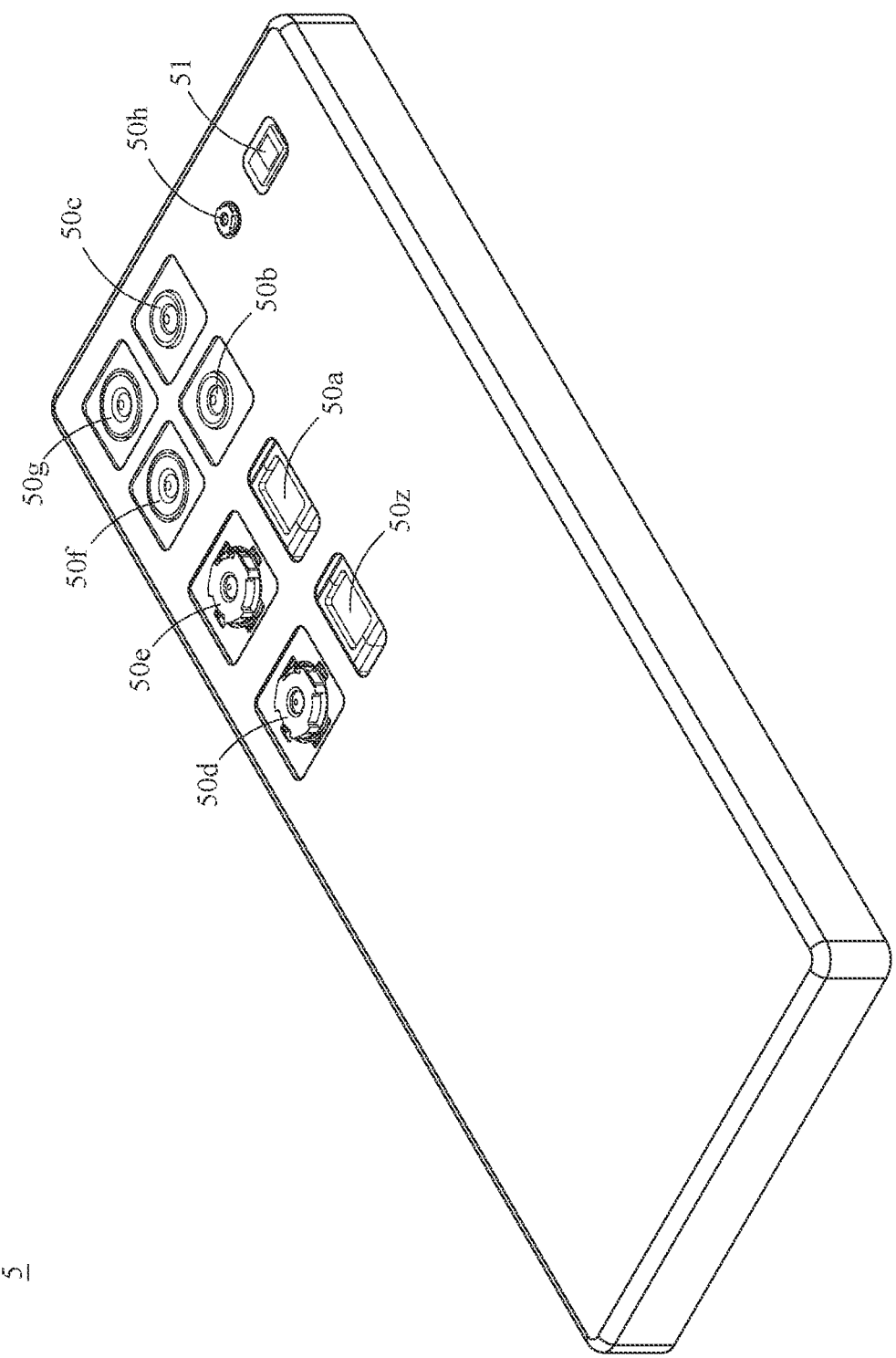
FIG. 21 is one perspective view of an electronic device according to the 5th embodiment of the present disclosure.

Please refer to FIG. 21, which is one perspective view of an electronic device according to the 5th embodiment of the present disclosure.

In this embodiment, the electronic device 5 is a smartphone including a camera module 50z, a camera module 50a, a camera module 50b, a camera module 50c, a camera module 50d, a camera module 50e, a camera module 50f, a camera module 50g, a camera module 50h, a flash module 51, an image signal processor, a display module and an image software processor (not shown). The camera module 50z, the camera module 50a, the camera module 50b, the camera module 50c, the camera module 50d, the camera module 50e, the camera module 50f, the camera module 50g and the camera module 50h are disposed on the same side of the electronic device 5, while the display module is disposed on the opposite side of the electronic device 5. At least one of the camera modules 50z, 50a, 50b, 50c, 50d, 50e, 50f, 50g and 50h includes the camera module of the present disclosure.

The camera module 50z is a telephoto camera module, the camera module 50a is a telephoto camera module, the camera module 50b is a telephoto camera module, the camera module 50c is a telephoto camera module, the camera module 50d is a wide-angle camera module, the camera module 50e is a wide-angle camera module, the camera module 50f is an ultra-wide-angle camera module, the camera module 50g is an ultra-wide-angle camera module, and the camera module 50h is a ToF (time of flight) camera module. In this embodiment, the camera module 50z, the camera module 50a, the camera module 50b, the camera module 50c, the camera module 50d, the camera module 50e, the camera module 50f and the camera module 50g have different fields of view, such that the electronic device 5 can have various magnification ratios so as to meet the requirement of optical zoom functionality. In addition, the camera module 50z and the camera module 50a are telephoto camera modules having a light-folding element configuration. In addition, the camera module 50h can determine depth information of the imaged object. In this embodiment, the electronic device 5 includes a plurality of camera modules 50z, 50a, 50b, 50c, 50d, 50e, 50f, 50g, and 50h, but the present disclosure is not limited to the number and arrangement of camera module. When a user captures images of an object, the light rays converge in the camera modules 50z, 50a, 50b, 50c, 50d, 50e, 50f, 50g or 50h to generate an image(s), and the flash module 51 is activated for light supplement. Further, the subsequent processes are performed in a manner similar to the abovementioned embodiments, so the details in this regard will not be provided again.

6th Embodiment

Figure 22:
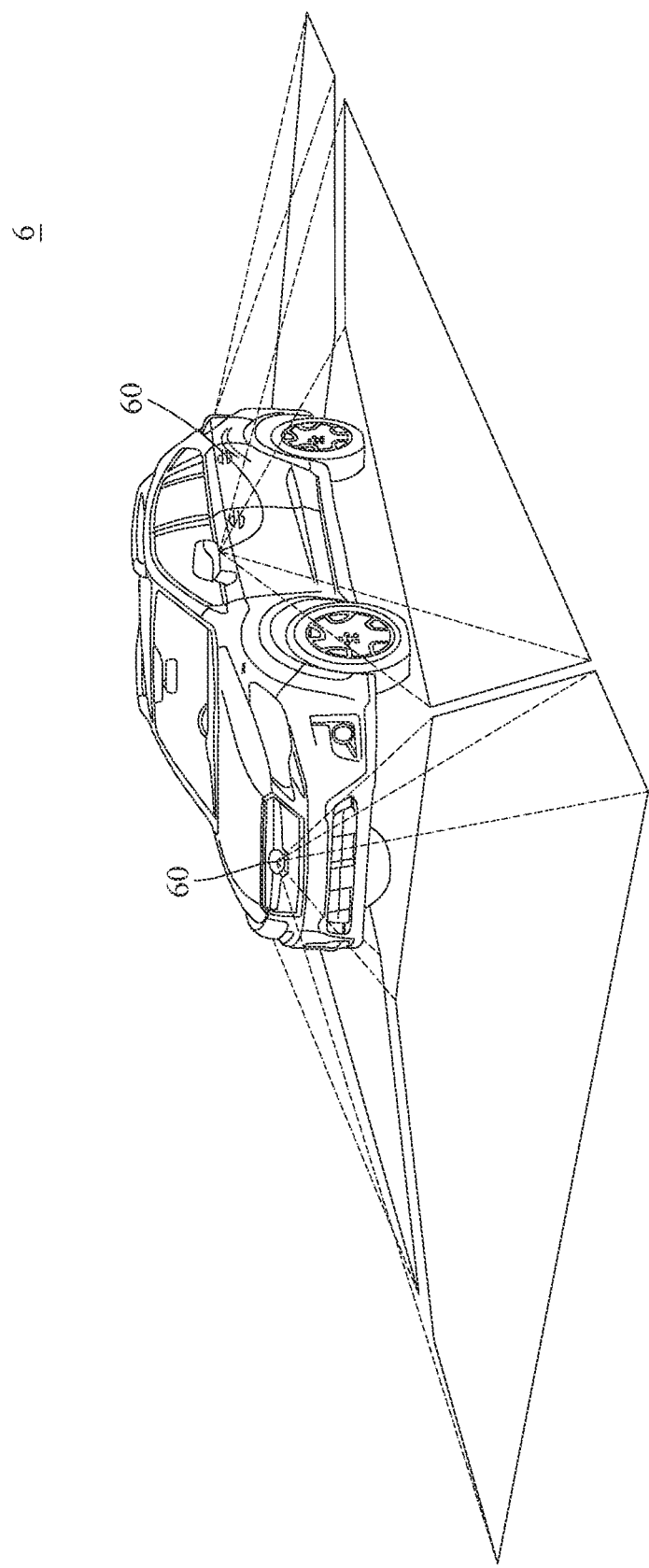
FIG. 22 is a perspective view of a vehicle device according to the 6th embodiment of the present disclosure.
Figure 23:
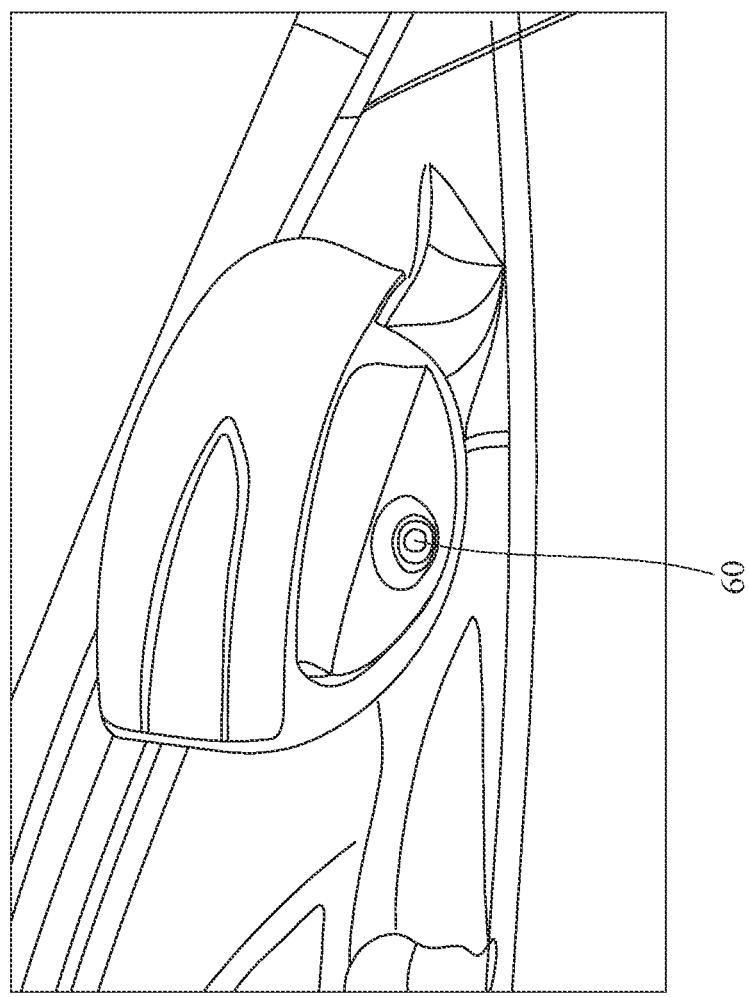
FIG. 23 is a partial view of the vehicle device in FIG. 22.
Figure 24:
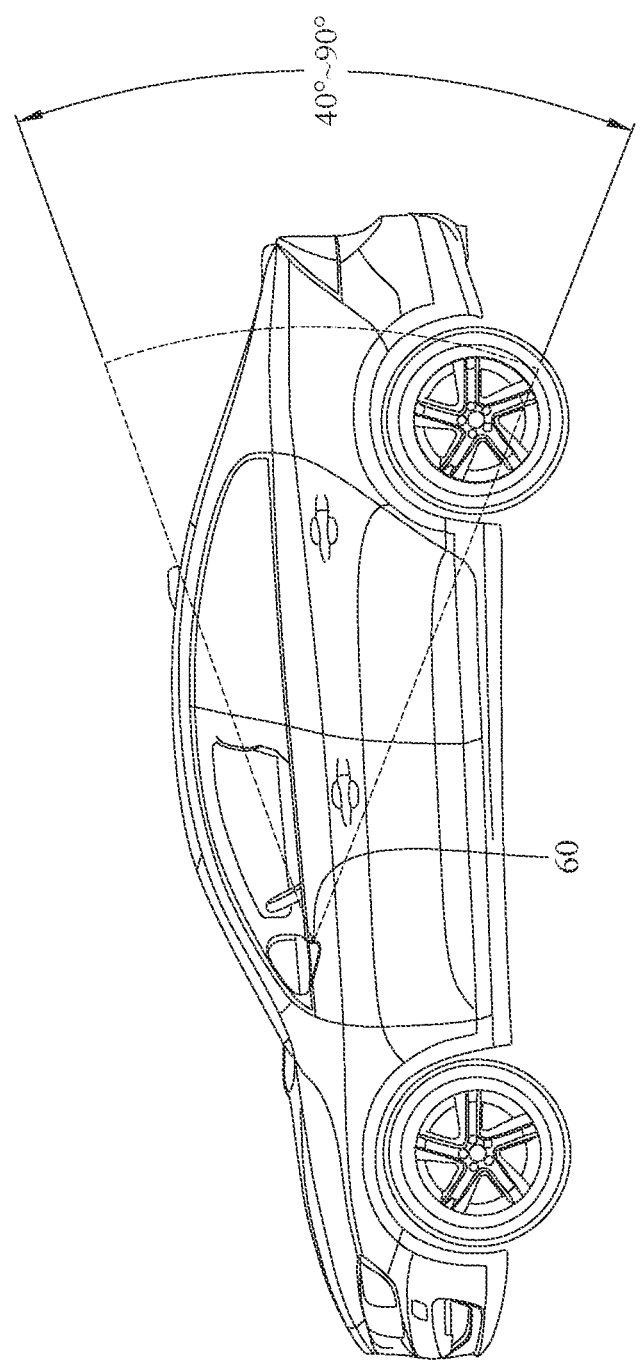
FIG. 24 is a side view of the vehicle device in FIG. 22.
Figure 25:
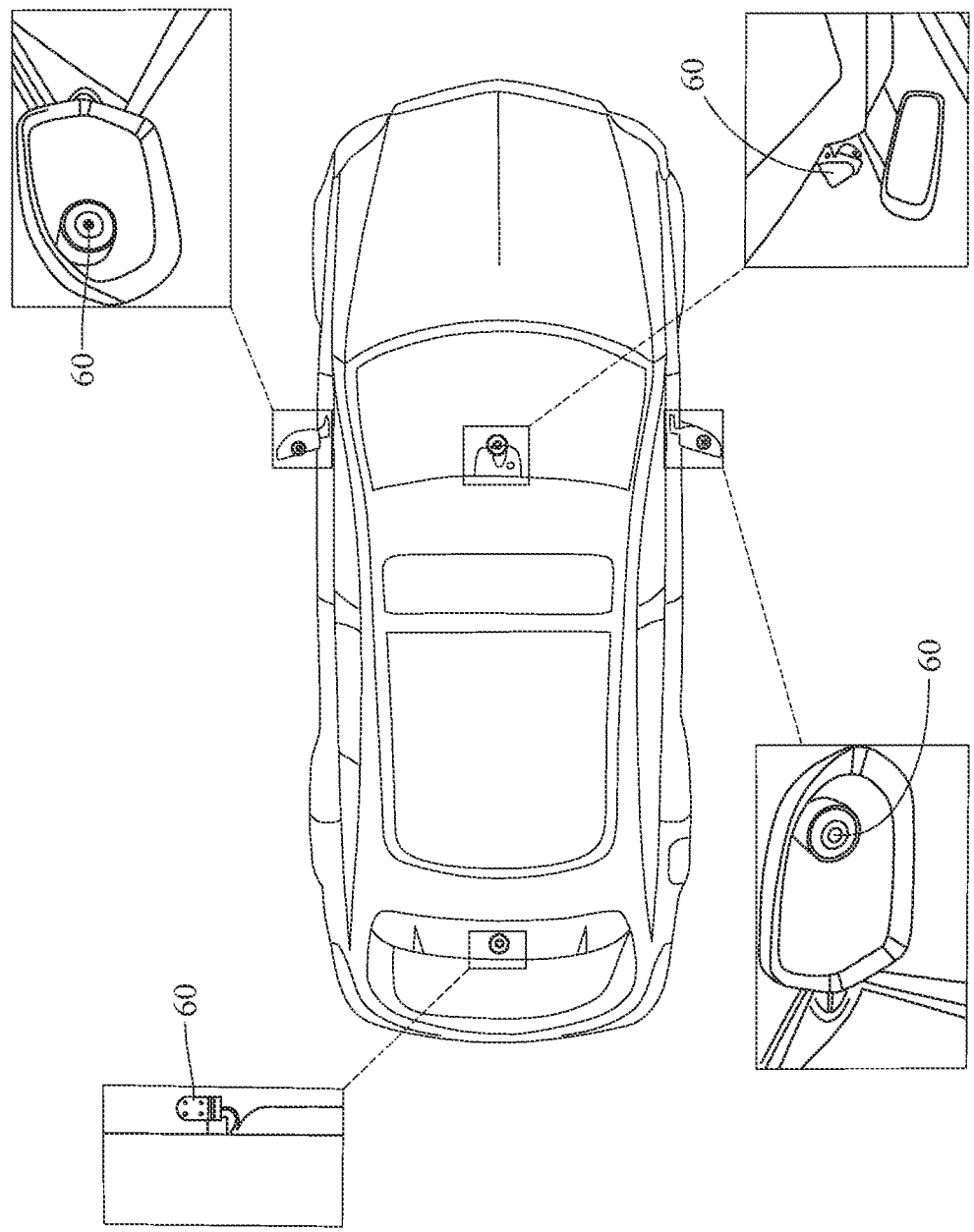
FIG. 25 is a top view of the vehicle device in FIG. 22.

Please refer to FIG. 22 to FIG. 25. FIG. 22 is a perspective view of a vehicle device according to the 6th embodiment of the present disclosure, FIG. 23 is a partial view of the vehicle device in FIG. 22, FIG. 24 is a side view of the vehicle device in FIG. 22, and FIG. 25 is a top view of the vehicle device in FIG. 22.

In this embodiment, the vehicle device 6 is an automobile. The vehicle device 6 includes a plurality of automotive camera modules 60, and the camera modules 60, for example, each includes the camera module of the present disclosure. The camera modules 60 can be served as, for example, panoramic view car cameras, dashboard cameras and vehicle backup cameras.

As shown in FIG. 22 and FIG. 23, the camera modules 60 are, for example, respectively disposed on the lower portion of the side mirrors, and the front and rear of the automobile to capture peripheral images of the automobile. The image software processor may blend the peripheral images into one panoramic view image for the driver's checking every corner surrounding the automobile, thereby favorable for parking and driving.

As shown in FIG. 24, the camera modules 60 are, for example, respectively disposed on the lower portion of the side mirrors. A maximum field of view of the camera modules 60 can be 40 degrees to 90 degrees for capturing images in regions on left and right lanes.

As shown in FIG. 25, the camera modules 60 can also be, for example, respectively disposed inside the side mirrors and the front and rear windshields for providing external information to the driver, and also providing more viewing angles so as to reduce blind spots, thereby improving driving safety.

The smartphones in the embodiments are only exemplary for showing the camera module of the present disclosure installed in an electronic device or a vehicle device, and the present disclosure is not limited thereto. The camera module can be optionally applied to optical systems with a movable focus. Furthermore, the camera module feature good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, motion sensing input devices, wearable devices, other electronic imaging devices and other vehicle devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
an imaging lens assembly, having an optical axis; and
a driving device, comprising:
  a fixed component;
  a lens carrier, wherein the imaging lens assembly is disposed in the lens carrier;
  a magnet carrier, having a first groove group and a second groove group, wherein the first groove group extends along a first direction parallel to the optical axis, and the second groove group extends along a second direction perpendicular to the optical axis;
  a first ball group, disposed in the first groove group; and
  a second ball group, disposed in the second groove group;
  wherein one of the fixed component and the lens carrier has a third groove group, and another one of the fixed component and the lens carrier has a fourth groove group; the third groove group extends along a third direction being perpendicular to the optical axis and being different from the second direction and is disposed opposite to the second groove group, the second ball group is disposed in the third groove group, and the imaging lens assembly is movable with respect to the fixed component on a plane defined by the third direction and the second direction via the second ball group; the fourth groove group extends along the first direction parallel to the optical axis and is disposed opposite to the first groove group, the first ball group is disposed in the fourth groove group, and the imaging lens assembly is movable with respect to the fixed component along the first direction via the first ball group;
  wherein the third direction is orthogonal to the second direction, and each of the third groove group and the second groove group is in physical contact with the second ball group;
  wherein the second ball group comprises at least one ball that is in two-points contact with one of the third groove group and the second groove group and in one-point contact with another one of the third groove group and the second groove group.

2. The camera module according to claim 1, wherein the lens carrier has the third groove group, and the lens carrier is movable with respect to the magnet carrier on the plane defined by the third direction and the second direction; the fixed component has the fourth groove group, and the magnet carrier is movable with respect to the fixed component along the first direction.

3. The camera module according to claim 2, wherein the driving device further comprising:
  an auto focus magnet, disposed on the magnet carrier; and
  an auto focus coil, disposed on the fixed component, wherein the auto focus coil corresponds to the auto focus magnet so as to provide a driving force for moving the magnet carrier along the first direction.

4. The camera module according to claim 2, wherein the driving device further comprising:
  an image stabilization magnet, disposed on the lens carrier; and
  an image stabilization coil, disposed on the fixed component, wherein the image stabilization coil corresponds to the image stabilization magnet so as to provide a driving force for moving the lens carrier on the plane defined by the third direction and the second direction.

5. The camera module according to claim 1, wherein the fixed component has the third groove group, and the magnet carrier is movable with respect to the fixed component on the plane defined by the third direction and the second direction; the lens carrier has the fourth groove group, and the lens carrier is movable with respect to the magnet carrier along the first direction.

6. The camera module according to claim 5, wherein the driving device further comprising:
  an auto focus magnet, disposed on the lens carrier; and
  an auto focus coil, disposed on the fixed component, wherein the auto focus coil corresponds to the auto focus magnet so as to provide a driving force for moving the lens carrier along the first direction.

7. The camera module according to claim 5, wherein the driving device further comprising:
  an image stabilization magnet, disposed on the magnet carrier; and
  an image stabilization coil, disposed on the fixed component, wherein the image stabilization coil corresponds to the image stabilization magnet so as to provide a driving force for moving the magnet carrier on the plane defined by the third direction and the second direction.

8. An electronic device, comprising the camera module of claim 1.

9. A vehicle device, comprising the camera module of claim 1.

10. A camera module, comprising:
an imaging lens assembly, having an optical axis; and
a driving device, comprising:
  a fixed component;
  a lens carrier, wherein the imaging lens assembly is disposed in the lens carrier;
  a magnet carrier, having a first groove group and a second groove group, wherein the first groove group extends along a first direction parallel to the optical axis, and the second groove group extends along a second direction perpendicular to the optical axis;
  a first ball group, disposed in the first groove group; and
  a second ball group, disposed in the second groove group;
  wherein one of the fixed component and the lens carrier has a third groove group, and another one of the fixed component and the lens carrier has a fourth groove group; the third groove group extends along a third direction being perpendicular to the optical axis and being different from the second direction and is disposed opposite to the second groove group, the second ball group is disposed in the third groove group, and the imaging lens assembly is movable with respect to the fixed component on a plane defined by the third direction and the second direction via the second ball group; the fourth groove group extends along the first direction parallel to the optical axis and is disposed opposite to the first groove group, the first ball group is disposed in the fourth groove group, and the imaging lens assembly is movable with respect to the fixed component along the first direction via the first ball group;

wherein the second groove group has at least one strip V-shaped groove and at least one U-shaped groove, the third groove group has at least one strip V-shaped groove and at least one U-shaped groove, the at least one strip V-shaped groove of the second groove group and the at least one strip V-shaped groove of the third groove group each extend along a direction to be orthogonal to each other, the at least one strip V-shaped groove of the second groove group corresponds to the at least one U-shaped groove of the third groove group, and the at least one U-shaped groove of the second groove group corresponds to the at least one strip V-shaped groove of the third groove group.

11. The camera module according to claim 10, wherein the lens carrier has the third groove group, and the lens carrier is movable with respect to the magnet carrier on the plane defined by the third direction and the second direction; the fixed component has the fourth groove group, and the magnet carrier is movable with respect to the fixed component along the first direction.

12. The camera module according to claim 11, wherein the driving device further comprising:
an auto focus magnet, disposed on the magnet carrier; and
an auto focus coil, disposed on the fixed component, wherein the auto focus coil corresponds to the auto focus magnet so as to provide a driving force for moving the magnet carrier along the first direction.

13. The camera module according to claim 11, wherein the driving device further comprising:
an image stabilization magnet, disposed on the lens carrier; and
an image stabilization coil, disposed on the fixed component, wherein the image stabilization coil corresponds to the image stabilization magnet so as to provide a driving force for moving the lens carrier on the plane defined by the third direction and the second direction.

14. The camera module according to claim 10, wherein the fixed component has the third groove group, and the magnet carrier is movable with respect to the fixed component on the plane defined by the third direction and the second direction; the lens carrier has the fourth groove group, and the lens carrier is movable with respect to the magnet carrier along the first direction.

15. The camera module according to claim 14, wherein the driving device further comprising:
an auto focus magnet, disposed on the lens carrier; and
an auto focus coil, disposed on the fixed component, wherein the auto focus coil corresponds to the auto focus magnet so as to provide a driving force for moving the lens carrier along the first direction.

16. The camera module according to claim 14, wherein the driving device further comprising:
an image stabilization magnet, disposed on the magnet carrier; and
an image stabilization coil, disposed on the fixed component, wherein the image stabilization coil corresponds to the image stabilization magnet so as to provide a driving force for moving the magnet carrier on the plane defined by the third direction and the second direction.

17. The camera module according to claim 10, wherein the second groove group comprises at least four grooves, and the second ball group comprises at least four balls that are respectively disposed in the at least four grooves.

* * * * *